US012647928B2

(12) United States Patent
Reddy et al.

(10) Patent No.:     US 12,647,928 B2
(45) Date of Patent:          Jun. 2, 2026

(54) SCHEDULING AND REPORTING FOR POSITIONING USING PROXIMITY DEVICES

(71) Applicant: QUALCOMM Incorporated, San Diego, CA (US)

(72) Inventors: Varun Amar Reddy, San Diego, CA (US); Murray Jarvis, Cambridge (GB); Chengjin Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 18/240,690

(22) Filed: Aug. 31, 2023

(65) Prior Publication Data

US 2025/0081141 A1      Mar. 6, 2025

(51) Int. Cl.
*H04W 64/00*        (2009.01)
*H04B 17/318*       (2015.01)

(52) U.S. Cl.
CPC .......... *H04W 64/00* (2013.01); *H04B 17/328* (2023.05)

(58) Field of Classification Search
CPC .............................. H04W 64/00; H04B 17/328
USPC ....................................................... 455/456.1
See application file for complete search history.

(56) References Cited

U.S. PATENT DOCUMENTS

| | | | | |
|---|---|---|---|---|
| 2016/0374045 A1* | 12/2016 | Pandharipande | ......... | G01S 5/18 |
| 2019/0234743 A1* | 8/2019 | Roy | ........................ | G06F 16/29 |
| 2022/0051310 A1* | 2/2022 | Graube | .............. | G06Q 30/0633 |
| 2022/0283321 A1 | 9/2022 | Ng et al. | | |

OTHER PUBLICATIONS

International Search Report and Written Opinion—PCT/US2024/043653—ISA/EPO—Nov. 28, 2024.

* cited by examiner

*Primary Examiner* — Michael R Neff
(74) *Attorney, Agent, or Firm* — Procopio, Cory, Hargreaves & Savitch LLP

(57)                  ABSTRACT
A wireless device may receive a first set of beacon messages from a first set of proximity devices. The wireless device may measure the first set of beacon messages. The wireless device may calculate a first position estimate of the wireless device based on the measured first set of beacon messages and a first set of locations associated with the first set of proximity devices. The wireless device may transmit the first position estimate. The wireless device may receive a second set of beacon messages from a subset of a second set of proximity devices based on the first position estimate. The wireless device may measure the second set of beacon messages. The wireless device may calculate a second position estimate based on the measured second set of beacon messages and a second set of locations associated with the subset of the second set of proximity devices.

28 Claims, 20 Drawing Sheets

$\phi$ = Azimuth angle of departure (A-AoD)
$\theta$ = Zenith angle of departure (Z-AoD)
$\rho$ = Distance
$\phi'$ = Azimuth angle of arrival (A-AoA)
$\theta'$ = Zenith angle of arrival (Z-AoA)

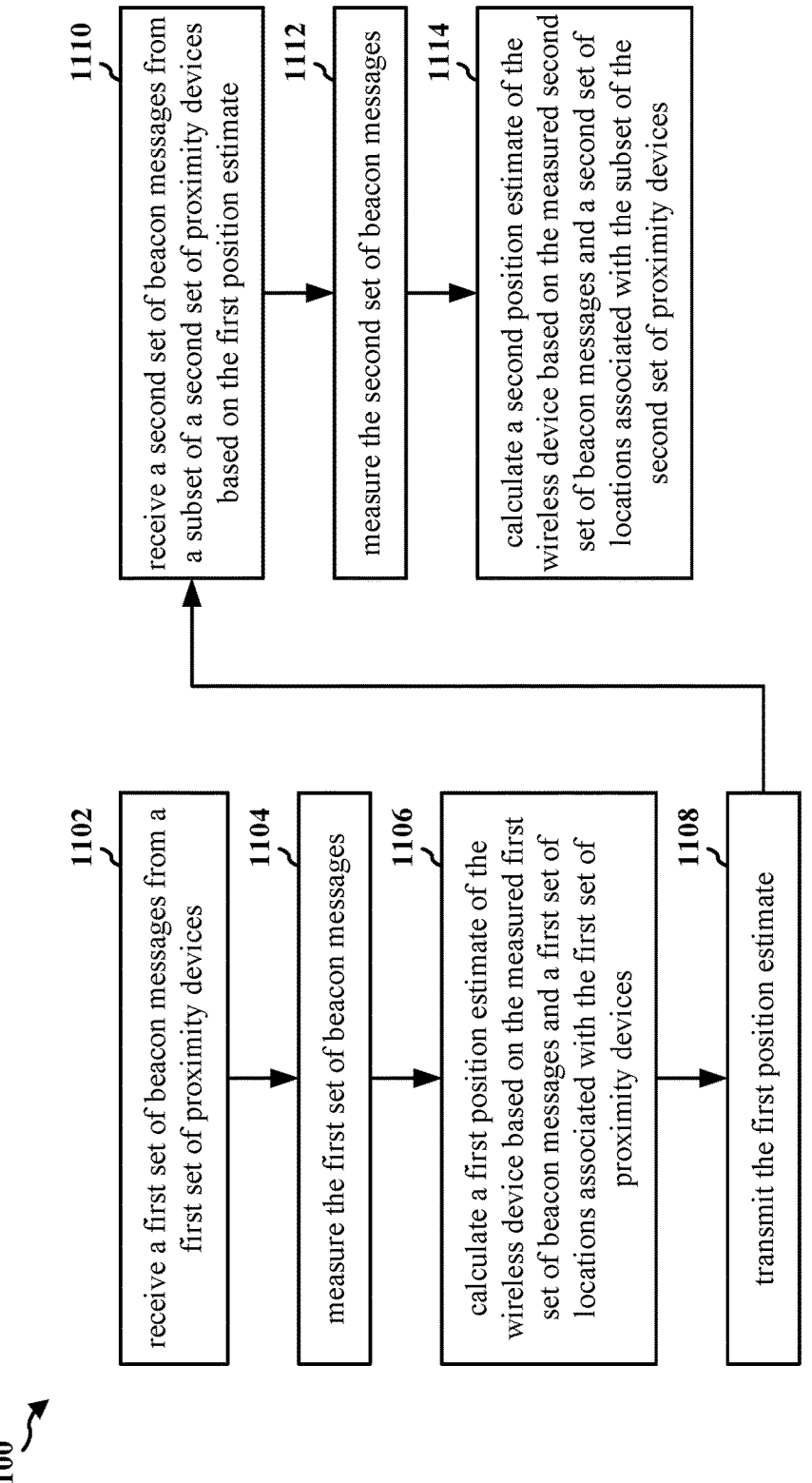

1100

1102 receive a first set of beacon messages from a first set of proximity devices 1104 measure the first set of beacon messages 1106 calculate a first position estimate of the wireless device based on the measured first set of beacon messages and a first set of locations associated with the first set of proximity devices 1108 transmit the first position estimate 1110 receive a second set of beacon messages from a subset of a second set of proximity devices based on the first position estimate 1112 measure the second set of beacon messages 1114 calculate a second position estimate of the wireless device based on the measured second set of beacon messages and a second set of locations associated with the subset of the second set of proximity devices

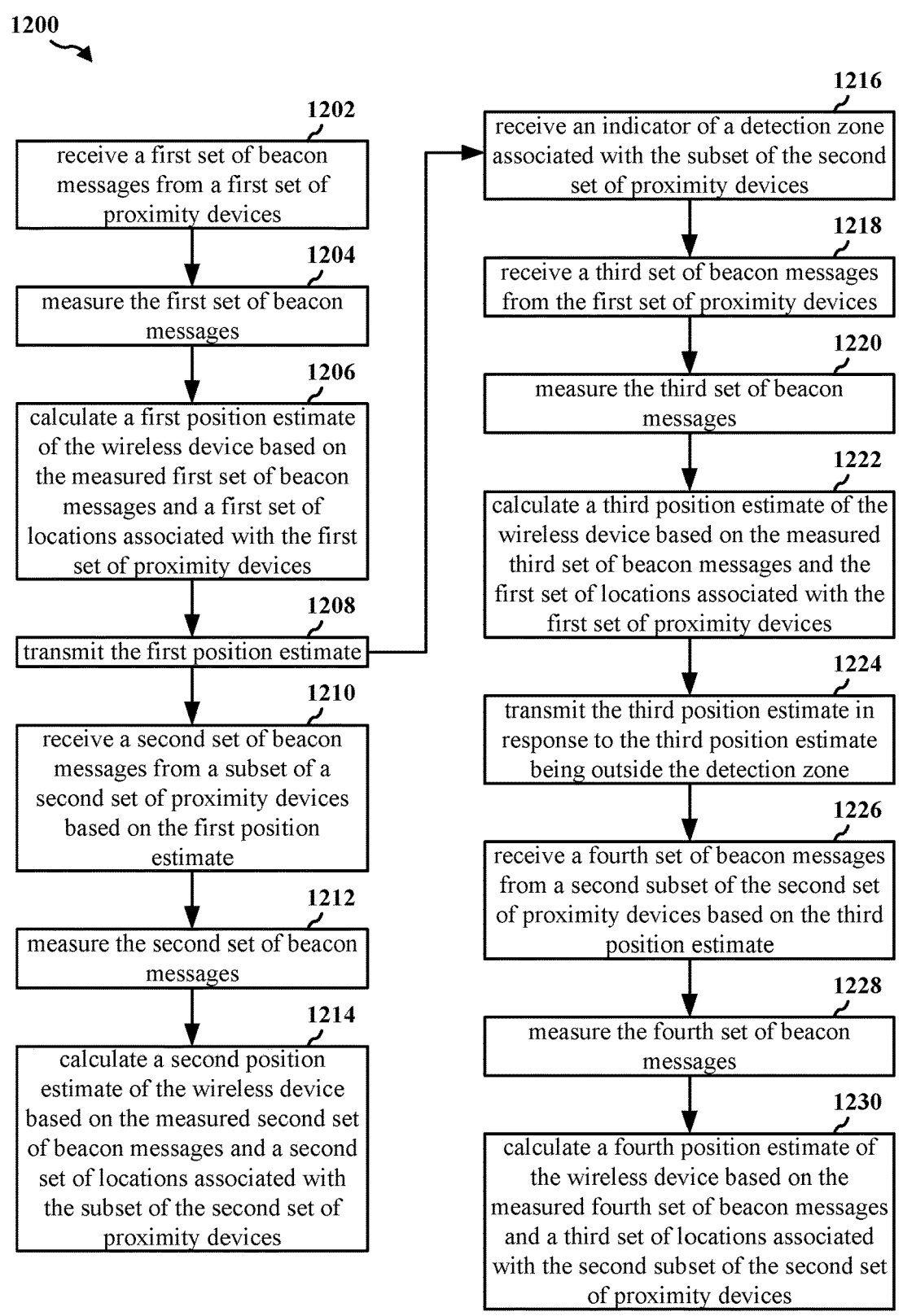

1202
receive a first set of beacon messages from a first set of proximity devices 1204
measure the first set of beacon messages 1206
calculate a first position estimate of the wireless device based on the measured first set of beacon messages and a first set of locations associated with the first set of proximity devices 1208
transmit the first position estimate 1210
receive a second set of beacon messages from a subset of a second set of proximity devices based on the first position estimate 1212
measure the second set of beacon messages 1214
calculate a second position estimate of the wireless device based on the measured second set of beacon messages and a second set of locations associated with the subset of the second set of proximity devices 1216
receive an indicator of a detection zone associated with the subset of the second set of proximity devices 1218
receive a third set of beacon messages from the first set of proximity devices 1220
measure the third set of beacon messages 1222
calculate a third position estimate of the wireless device based on the measured third set of beacon messages and the first set of locations associated with the first set of proximity devices 1224
transmit the third position estimate in response to the third position estimate being outside the detection zone 1226
receive a fourth set of beacon messages from a second subset of the second set of proximity devices based on the third position estimate 1228
measure the fourth set of beacon messages 1230
calculate a fourth position estimate of the wireless device based on the measured fourth set of beacon messages and a third set of locations associated with the second subset of the second set of proximity devices

FIG. 12

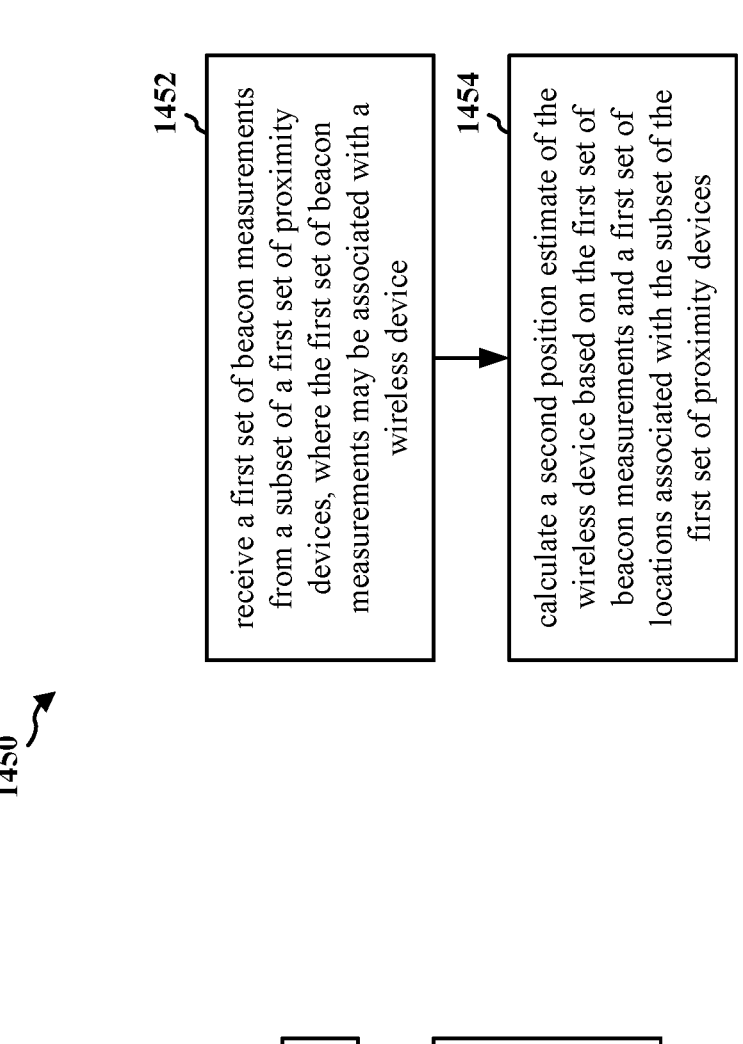

1450

1452 receive a first set of beacon measurements from a subset of a first set of proximity devices, where the first set of beacon measurements may be associated with a wireless device

1454 calculate a second position estimate of the wireless device based on the first set of beacon measurements and a first set of locations associated with the subset of the first set of proximity devices

1402 receive a first position estimate

1404 transmit a first set of beacon transmission schedules that schedule a first set of beacon messages from a subset of a first set of proximity devices based on the first position estimate of a wireless device

FIG. 14A

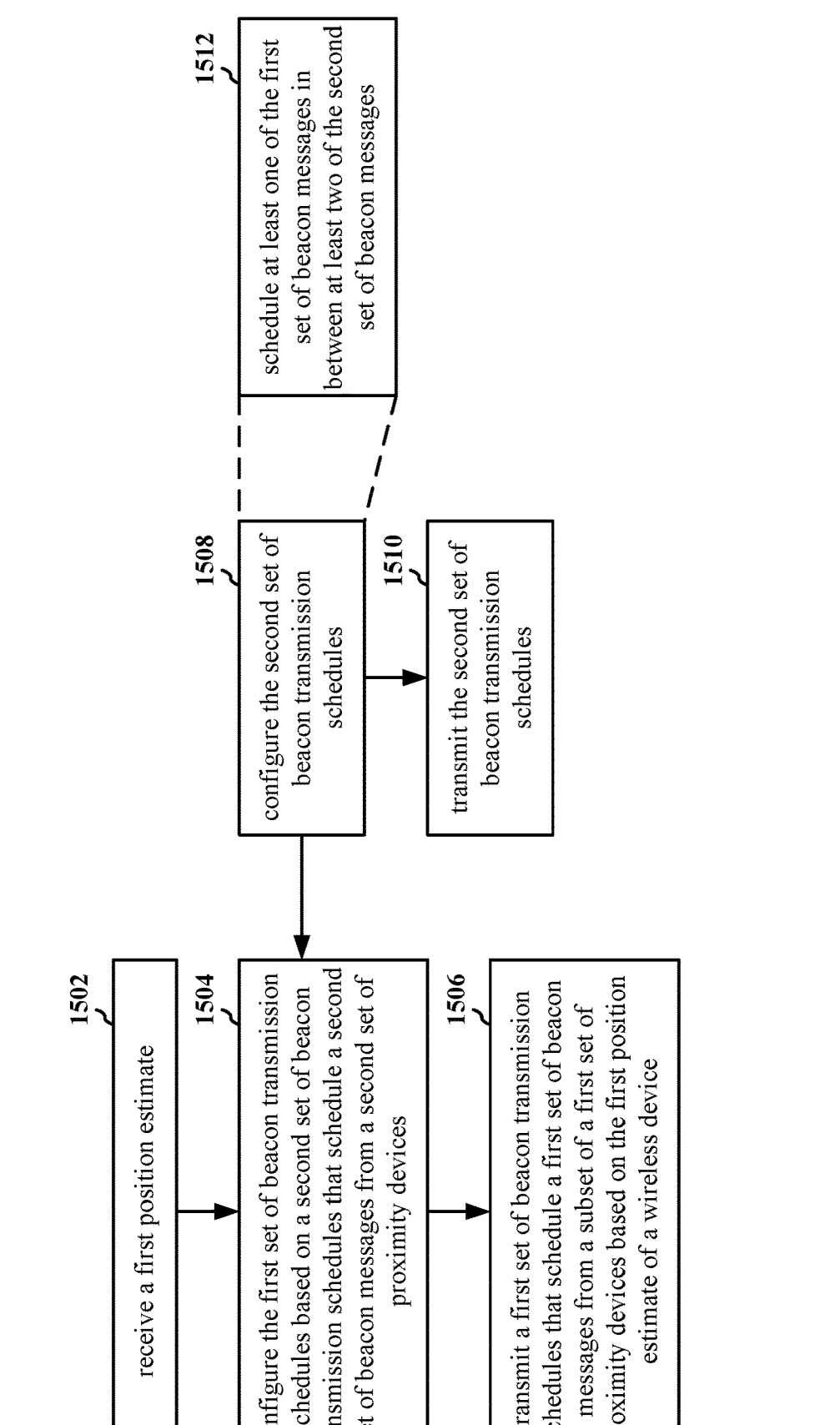

1500

1502 receive a first position estimate 1504 configure the first set of beacon transmission schedules based on a second set of beacon transmission schedules that schedule a second set of beacon messages from a second set of proximity devices 1506 transmit a first set of beacon transmission schedules that schedule a first set of beacon messages from a subset of a first set of proximity devices based on the first position estimate of a wireless device 1508 configure the second set of beacon transmission schedules 1510 transmit the second set of beacon transmission schedules 1512 schedule at least one of the first set of beacon messages in between at least two of the second set of beacon messages

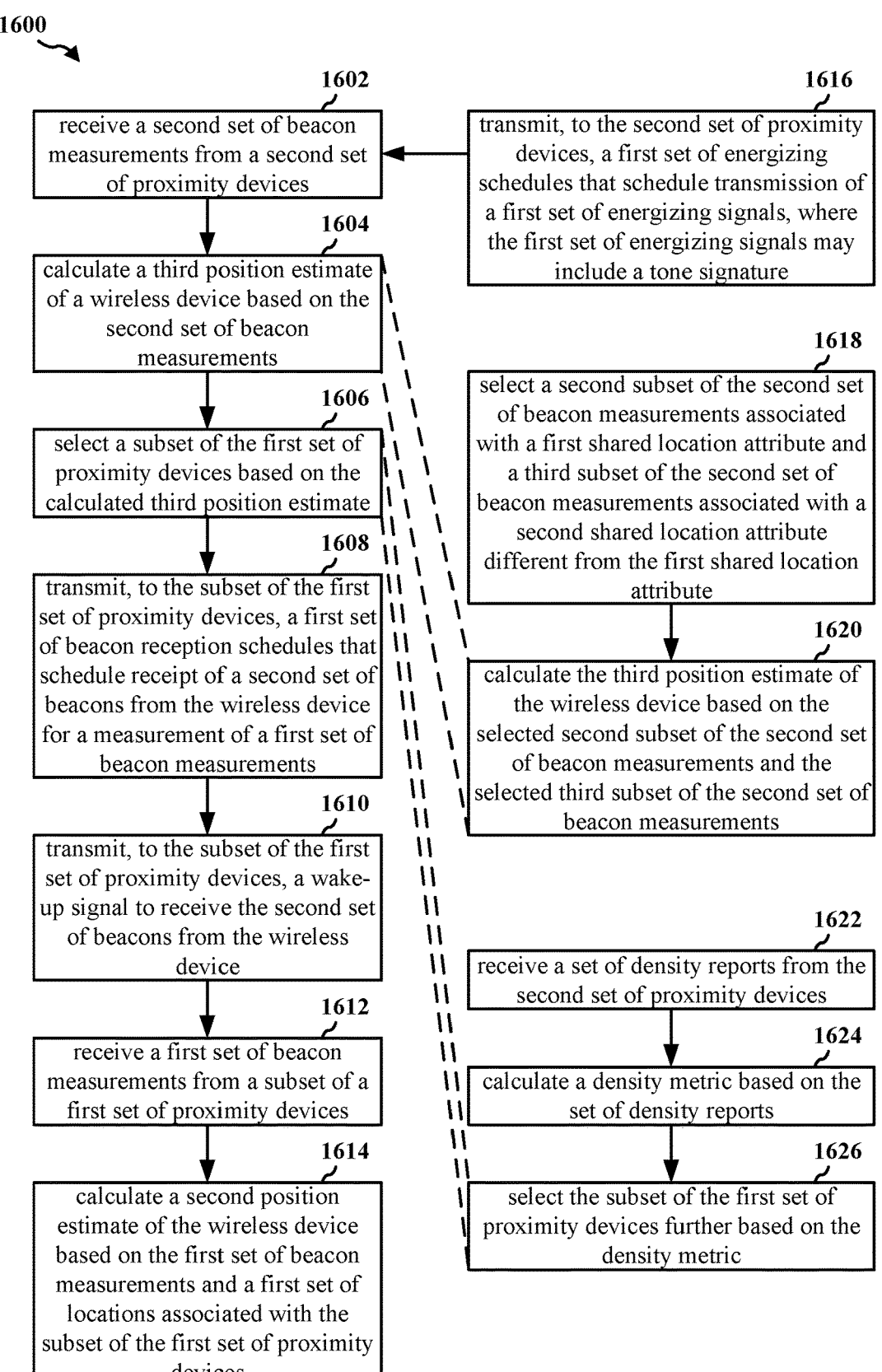

1602
receive a second set of beacon measurements from a second set of proximity devices

1604
calculate a third position estimate of a wireless device based on the second set of beacon measurements

1606
select a subset of the first set of proximity devices based on the calculated third position estimate

1608
transmit, to the subset of the first set of proximity devices, a first set of beacon reception schedules that schedule receipt of a second set of beacons from the wireless device for a measurement of a first set of beacon measurements

1610
transmit, to the subset of the first set of proximity devices, a wake-up signal to receive the second set of beacons from the wireless device

1612
receive a first set of beacon measurements from a subset of a first set of proximity devices

1614
calculate a second position estimate of the wireless device based on the first set of beacon measurements and a first set of locations associated with the subset of the first set of proximity devices

1616
transmit, to the second set of proximity devices, a first set of energizing schedules that schedule transmission of a first set of energizing signals, where the first set of energizing signals may include a tone signature

1618
select a second subset of the second set of beacon measurements associated with a first shared location attribute and a third subset of the second set of beacon measurements associated with a second shared location attribute different from the first shared location attribute

1620
calculate the third position estimate of the wireless device based on the selected second subset of the second set of beacon measurements and the selected third subset of the second set of beacon measurements

1622
receive a set of density reports from the second set of proximity devices

1624
calculate a density metric based on the set of density reports

1626
select the subset of the first set of proximity devices further based on the density metric

FIG. 16

1700

1702
receive a first position estimate 1704
transmit a first set of beacon transmission schedules that schedule a first set of beacon messages from a subset of a first set of proximity devices based on the first position estimate of a wireless device 1706
select the subset of the first set of proximity devices based on the first position estimate of the wireless device 1708
calculate a detection zone based on the selected subset of the first set of proximity devices 1710
transmit an indicator of the detection zone 1712
receive a third position estimate of the wireless device, where the third position estimate may be outside the detection zone 1714
select a second subset of the first set of proximity devices based on the third position estimate of the wireless device 1716
calculate a second detection zone based on the selected second subset of the first set of proximity devices 1718
transmit a second indicator of the second detection zone 1720
transmit a second set of beacon transmission schedules that schedule a second set of beacon messages from the second subset of the first set of proximity devices based on the second position estimate of the wireless device

FIG. 17

SCHEDULING AND REPORTING FOR POSITIONING USING PROXIMITY DEVICES

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of receiving a first set of beacon messages from a first set of proximity devices. The beacon calculation component 198 may be configured to measure the first set of beacon messages. The beacon calculation component 198 may be configured to calculate a first position estimate of the wireless device based on the measured first set of beacon messages and a first set of locations associated with the first set of proximity devices. The beacon calculation component 198 may be configured to transmit the first position estimate. The beacon calculation component 198 may be configured to receive a second set of beacon messages from a subset of a second set of proximity devices based on the first position estimate. The beacon calculation component 198 may be configured to measure the second set of beacon messages. The beacon calculation component 198 may be configured to calculate a second position estimate of the wireless device based on the measured second set of beacon messages and a second set of locations associated with the subset of the second set of proximity devices supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless device. The wireless device may include a user equipment (UE). The apparatus may receive a first set of beacon messages from a first set of proximity devices. The apparatus may measure the first set of beacon messages. The apparatus may calculate a first position estimate of the wireless device based on the measured first set of beacon messages and a first set of locations associated with the first set of proximity devices. The apparatus may transmit the first position estimate. The apparatus may receive a second set of beacon messages from a subset of a second set of proximity devices based on the first position estimate. The apparatus may measure the second set of beacon messages. The apparatus may calculate a second position estimate of the wireless device based on the measured second set of beacon messages and a second set of locations associated with the subset of the second set of proximity devices. The first set of proximity devices may include a set of energizers that provide energy to the subset of the second set of proximity devices. The second set of proximity devices may include a set of electronic shelf label (ESL) devices.

In an aspect of the disclosure, a method, a computer-readable medium, and an apparatus are provided. The apparatus may include a network node. The network node may include a network device, such as an edge server, or may include an energizer access point (AP). The apparatus may receive a first position estimate of a wireless device. The apparatus may transmit a first set of beacon transmission schedules that schedule a first set of beacon messages from the subset of the first set of proximity devices based on the first position estimate of the wireless device. The apparatus may receive a first set of beacon measurements from a subset of a first set of proximity devices. The first set of beacon measurements may be associated with the wireless device. For example, the wireless device may transmit a set of beacons that are measured by a proximity device, such as an energizer device or an ESL device. The apparatus may calculate a second position estimate of the wireless device based on the first set of beacon measurements and a first set of locations associated with the subset of the first set of proximity devices. The first set of proximity devices may include a set of ESL devices.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a flowchart of a method of wireless communication.

FIG. 12 is a flowchart of a method of wireless communication.

FIG. 14A is a flowchart of a method of wireless communication.

FIG. 14B is a flowchart of a method of wireless communication.

FIG. 15 is a flowchart of a method of wireless communication.

FIG. 16 is a flowchart of a method of wireless communication.

FIG. 17 is a flowchart of a method of wireless communication.

DETAILED DESCRIPTION

Figure 1:
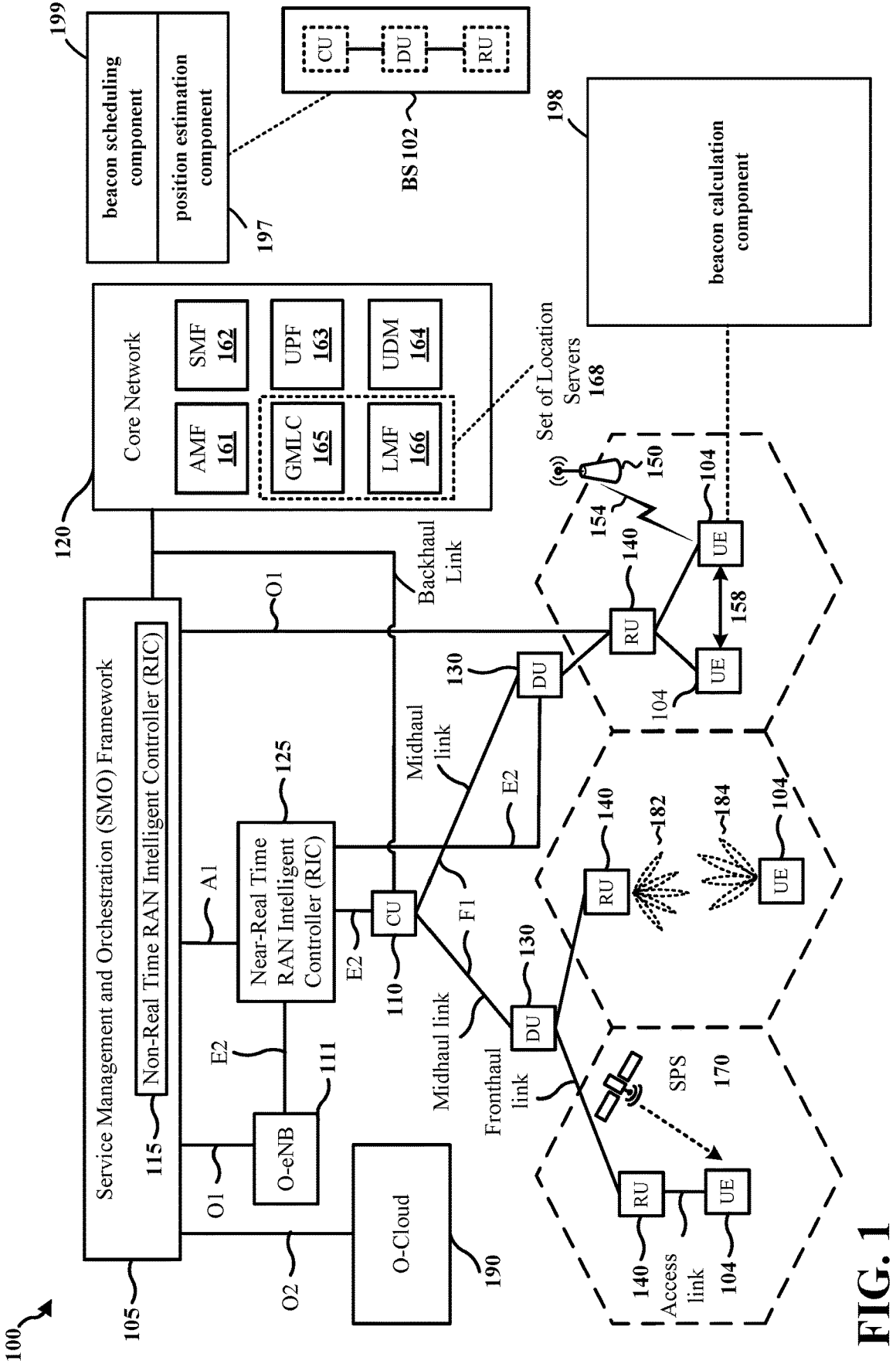
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-IMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to a positioning system. Some aspects more specifically relate to positioning systems that leverage proximity devices with known positions/locations, such as electronic shelf label (ESL) devices or energizer devices. In some examples, a wireless device may receive a first set of beacon messages from a first set of proximity devices. The wireless device may include a user equipment (UE). The wireless device may measure the first set of beacon messages. The wireless device may calculate a first position estimate of the wireless device based on the measured first set of beacon messages and a first set of locations associated with the first set of proximity devices. The wireless device may transmit the first position estimate. The wireless device may receive a second set of beacon messages from a subset of a second set of proximity devices based on the first position estimate. The wireless device may measure the second set of beacon messages. The wireless device may calculate a second position estimate of the wireless device based on the measured second set of beacon messages and a second set of locations associated with the subset of the second set of proximity devices. The first set of proximity devices may include a set of energizers that provide energy to the subset of the second set of proximity devices. The second set of proximity devices may include a set of electronic shelf label (ESL) devices.

In some examples, a network node may receive a first position estimate of a wireless device. The network node may transmit a first set of beacon transmission schedules that schedule a first set of beacon messages from the subset of the first set of proximity devices based on the first position estimate of the wireless device. In some examples, a network node may receive a first set of beacon measurements from a subset of a first set of proximity devices. The first set of beacon measurements may be associated with the wireless device. For example, the wireless device may transmit a set of beacons that are measured by a proximity device, such as an energizer device or an ESL device. The network node may calculate a second position estimate of the wireless device based on the first set of beacon measurements and a first set of locations associated with the subset of the first set of proximity devices. The first set of proximity devices may include a set of ESL devices. The network node may include a network device, such as an edge server, or may include an energizer access point (AP).

In some aspects, a target device may obtain its coarse position estimate using energizers and fuse the coarse position estimate with a fine position estimate obtained using ESL devices to obtain a final position estimate. The target device may obtain its coarse position estimate via beacon signals transmitted by energizers by measuring downlink (DL) reference signal strength indicators (DL-RSSI), measuring high-accuracy distance measurements (HADM), and/or performing Bluetooth channel sounding (BCS). The target device may obtain its fine position estimate via beacon signals transmitted by ESL devices by measuring DL-RSSI. The target device may indicate its coarse position estimate to an edge server. In response, the edge server may indicate a subset of ESLs to compute the fine estimate. The target device may indicate its coarse position estimate to an edge server so that the edge server may indicate a boundary region to which the selected subset of ESLs may apply. Once the target device moves out of the boundary region, the target device may request the edge server for a new subset of ESLs that are associated with the new position/location of the target device. In some aspects, a network may determine the coarse position estimate of a target device using energizers and relay the coarse position estimate to an edge server. The energizers may measure uplink (UL) RSSI (UL-RSSI) transmitted by the target device. The edge server may direct a group of ESLs in the vicinity of the target device to wake up and listen (e.g., in Rx mode) for beacon transmissions from the target device to calculate the fine position estimate. In some aspects, a network may schedule DL-RSSI transmissions from the ESLs and the HADM packets to assist positioning fusion at the target device. The transmissions/packets may be coupled in a time domain and/or overlapped in time. In some aspects, a network may configure ESL operation based on a density of target devices in given area. For example, a network may awaken a larger number of ESLs more frequently in a high density scenario than a low density scenario. In some aspects, a system may select a subset of ESLs based on the geometry of the ESLs (e.g., row and shelf location, ESL density, interference likelihood, power characteristics, mobility of the target device, and/or room for error).

A positioning system utilizing both coarse proximity devices (e.g., energizers) and fine proximity devices (e.g., ESLs) to calculate a position of a wireless device may utilize a server (e.g., a centralized device, a set of cloud devices working cooperatively with one another) to schedule transmission of beacon signals, measurement of beacon signals, and reporting of measurements and/or calculated locations based on the measurements. The measurements may include, for example, DL-RSSI, UL-RSSI, BCS, or HADM. The positioning system may have a set of message flows between the server, the coarse proximity devices, and the fine proximity devices. The server may select a subset of the fine proximity devices to calculate the position of the wireless device, and may configure a boundary region/threshold associated with that selected subset, such that in response to determining that the wireless device travels beyond the boundary region/threshold, a new subset associated with the wireless device's new location is selected. The server may use various decision criteria for choosing/forming a selected subset of fine proximity devices, for example a location of the wireless device and/or location attributes of the fine proximity devices. In some aspects, the server may schedule different kinds of measurements or different kinds of beacon signals (e.g., RSSI and HADM/BCS) to occur within the same time domain such that calculations that fuse data from both can improve positioning of the wireless device. In some aspects, where a large number of wireless devices may cause interference with one another's signals, the server may increase the scale of the positioning session, for example by increasing a number of selected fine proximity devices, increasing a power used to transmit beacon signals, reusing frequencies for beacon signals, utilizing timing offsets to decrease interference, and/or configuring passive IoT devices (e.g., tags without batteries) using an energizer signal. In some aspects, location attributes (e.g., row identifiers (IDs), shelf IDs, aisle IDs, row IDs, column IDs, height IDs) may be utilized to improve positioning performance using prior knowledge.

Particular aspects of the subject matter described in this disclosure can be implemented to realize one or more of the following potential advantages. In some examples, by utilizing both coarse proximity devices (e.g., energizers) and fine proximity devices (e.g., ESLs) to calculate the position of a wireless device, the described techniques can be used to track a wireless device, navigate the wireless device, track an asset, and/or manage inventory. Such a system may provide scalable positioning systems for any number of target devices, and may improve positioning performance using prior knowledge, such as knowledge of the location (e.g., row/column/shelf identifiers) of proximity devices with known locations. Such ESLs and energizers may be deployed in smart retail use-case scenarios, for example for indoor navigation of a store, tracking of assets within a retail environment, or for inventory management. The improved signal measurements may enhance the specifications/standard for Bluetooth SIG ESL devices.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualize d network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/NIL models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5GNR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a beacon calculation component 198 that may be configured to receive a first set of beacon messages from a first set of proximity devices. The beacon calculation component 198 may be configured to measure the first set of beacon messages. The beacon calculation component 198 may be configured to calculate a first position estimate of the wireless device based on the measured first set of beacon messages and a first set of locations associated with the first set of proximity devices. The beacon calculation component 198 may be configured to transmit the first position estimate. The beacon calculation component 198 may be configured to receive a second set of beacon messages from a subset of a second set of proximity devices based on the first position estimate. The beacon calculation component 198 may be configured to measure the second set of beacon messages. The beacon calculation component 198 may be configured to calculate a second position estimate of the wireless device based on the measured second set of beacon messages and a second set of locations associated with the subset of the second set of proximity devices. In certain aspects, the base station 102 may have a beacon scheduling component 199 that may be configured to receive a first position estimate of a wireless device. The beacon scheduling component 199 may be configured to transmit a first set of beacon transmission schedules that schedule a first set of beacon messages from the subset of the first set of proximity devices based on the first position estimate of the wireless device. In certain aspects, the base station 102 may have a position estimation component 197 that may be configured to receive a first set of beacon measurements from a subset of a first set of proximity devices. The position estimation component 197 may be configured to calculate a second position estimate of the wireless device based on the first set of beacon measurements and a first set of locations associated with the subset of the first set of proximity devices. In other words, the beacon scheduling component 199 may configure reporting for positioning of target devices, for example UE 104, based on uplink (UL) or downlink (DL) measurements (e.g., UL reference signal strength indicator (RSSI) (UL-RSSI) or DL-RSSI).

Figures 2A, 2B, 2C, 2D:
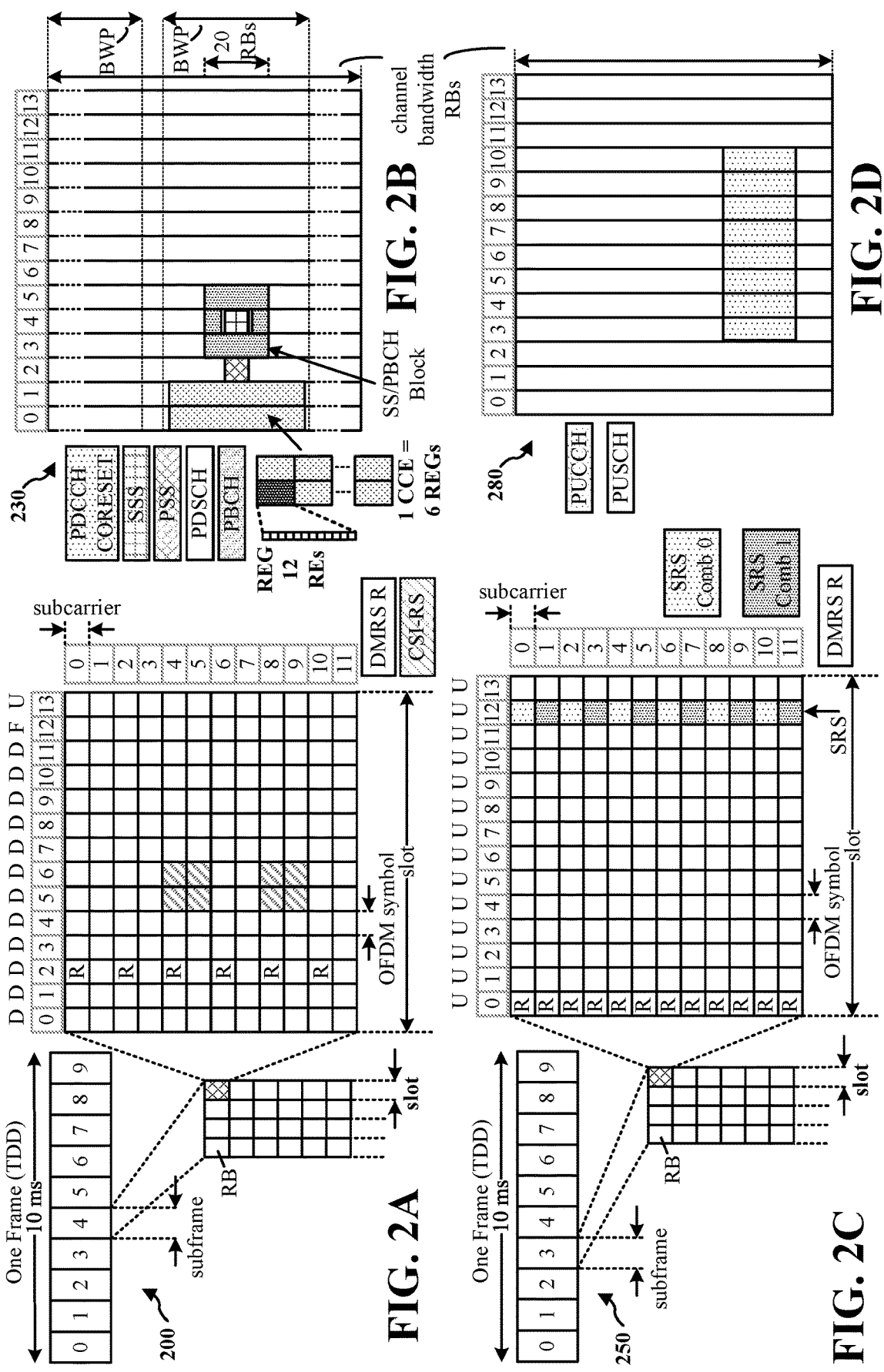
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^\mu \cdot 15$[kHz] | Cyclic prefix |
| 0 | 15 | Normal |
| 1 | 30 | Normal |
| 2 | 60 | Normal, Extended |

15

TABLE 1-continued

Numerology, SCS, and CP

| μ | SCS<br>$\Delta f = 2^\mu \cdot 15[kHz]$ | Cyclic prefix |
|---|---|---|
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
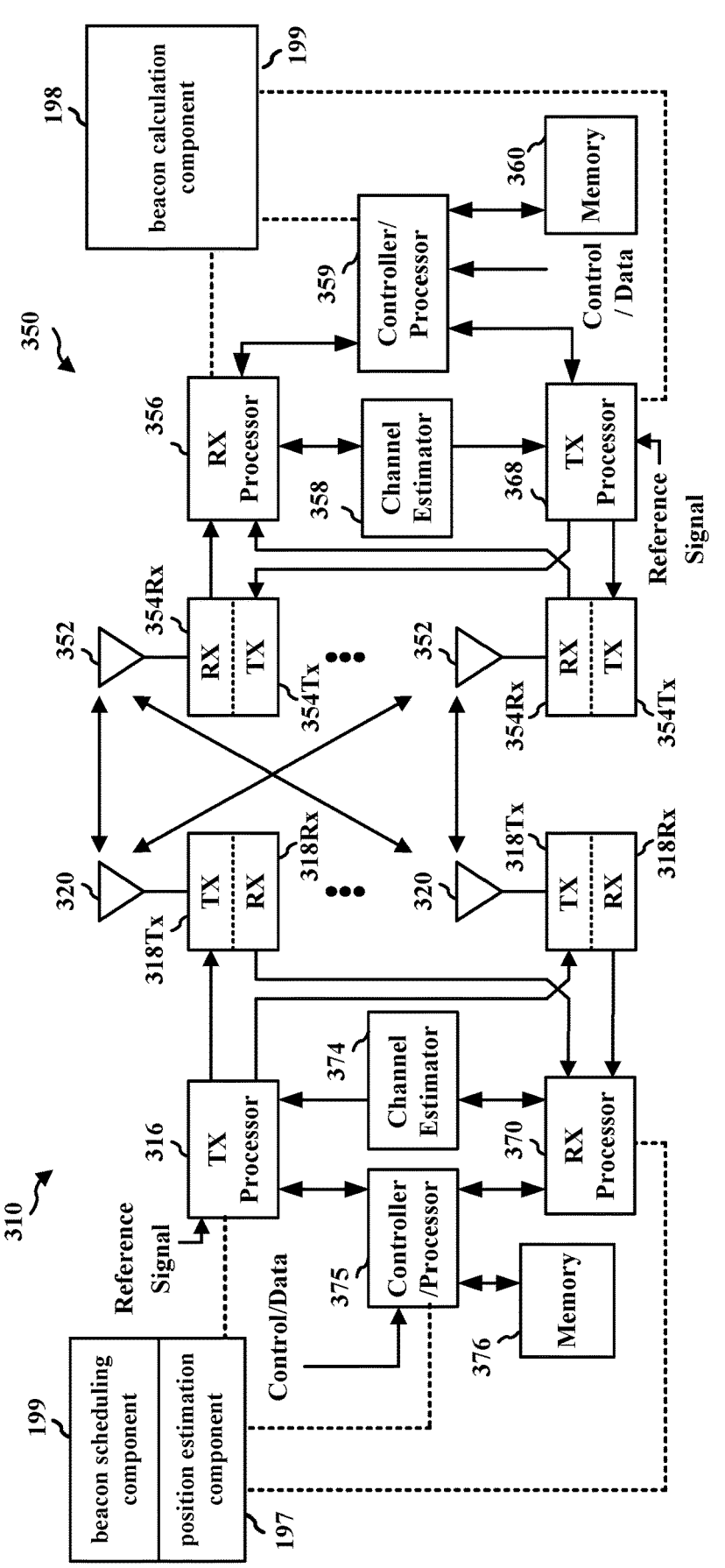
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beacon calculation component 198 of FIG. 1.

At least one of the TX processor 316, the RX processor 370, and the controller/processor 375 may be configured to perform aspects in connection with the beacon scheduling component 199 of FIG. 1.

At least one of the TX processor 316, the RX processor 370, and the controller/processor 375 may be configured to perform aspects in connection with the position estimation component 197 of FIG. 1.

Figure 4:
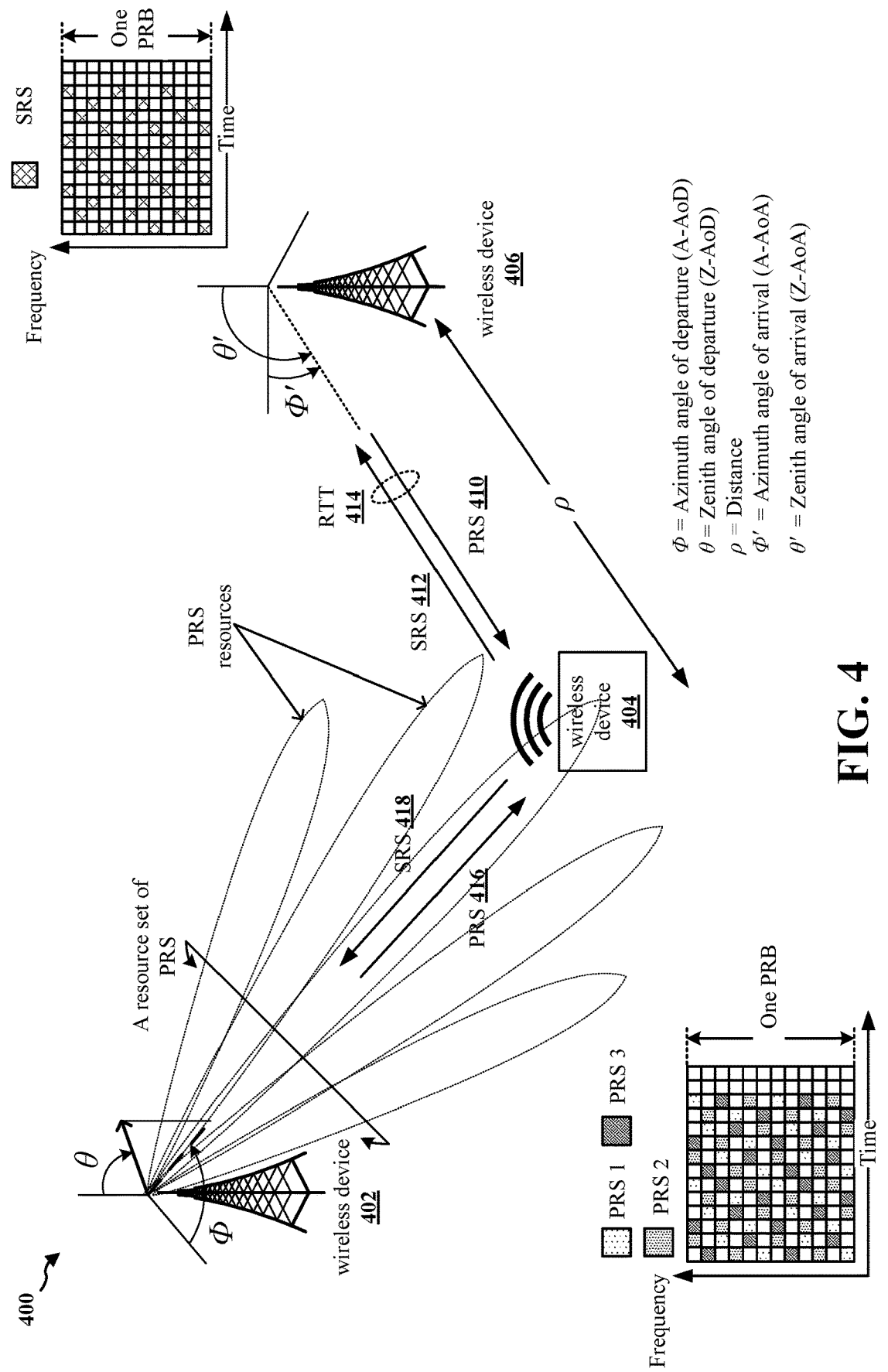
FIG. 4 is a diagram illustrating an example of positioning based on positioning signal measurements.

FIG. 4 is a diagram 400 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. The wireless device 404 may be a UE or a TRP configured to perform positioning to gather data, for example to gather data to train an artificial intelligence machine learning (AI/ML or AIML) model, test positioning signal strength or test positioning noise attributes in an area. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $\|T_{SRS\_RX}-T_{PRS\_TX}\|-\|T_{SRS\_TX}-T_{PRS\_RX}\|$. Accordingly, multi-RTT positioning may make use of the UE Rx-Tx time difference measurements (i.e., $\|T_{SRS\_TX}-T_{PRS\_RX}\|$) and DL-PRS reference signal received power (RSRP) (DL-PRS-RSRP) of downlink signals received from multiple wireless devices 402, 406 and measured by the wireless device 404, and the measured TRP Rx-Tx time difference measurements (i.e., $\|T_{SRS\_RX}-T_{PRS\_TX}\|$) and UL-SRS-RSRP at multiple wireless devices 402, 406 of uplink signals transmitted from wireless device 404. The wireless device 404 may measure the UE Rx-Tx time difference measurements (and optionally DL-PRS-RSRP of the received signals) using assistance data received from the positioning server, and the wireless devices 402, 406 may measure the gNB Rx-Tx time difference measurements (and optionally UL-SRS-RSRP of the received signals) using assistance data received from the positioning server. The measurements may be used at the positioning server or the wireless device 404 to determine the RTT. The RTT may be used to estimate the location of the wireless device 404. In some aspects, the range between wireless devices may be estimated via relative RTT measurements. Other methods are possible for determining the RTT, such as for example using DL-TDOA, UL-TDOA, and/or round-trip phase (RTP) measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402,

406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In some aspects, a wireless device may calculate a distance from another wireless device based on a reference signal strength indicator (RSSI). For example, the wireless device 404 may receive the DL-PRS 410 from the wireless device 406 and the DL-PRS 416 from the wireless device 402. The wireless device 404 may then calculate the range of the wireless device 404 from the wireless device 406 as compared with the range of the wireless device 404 from the wireless device 402 based on the DL-RSSI measurement of the DL-PRS 410 and the DL-RSSI measurement of the DL-PRS 416, respectively. In another aspect, the wireless device 406 may receive the UL-SRS 412 from the wireless device 404, and the wireless device 402 may receive the UL-SRS 418 from the wireless device 404. The wireless device 406 may measure an UL-RSSI measurement of the UL-SRS 412 and the wireless device 402 may measure an UL-RSSI measurement of the UL-SRS 418. A network entity, such as an LMF, may receive the measurements of the UL-RSSI measurements and calculate the range of the wireless device 404 from the wireless device 406 as compared with the range of the wireless device 404 from the wireless device 402 based on the UL-RSSI measurements.

Figure 5:
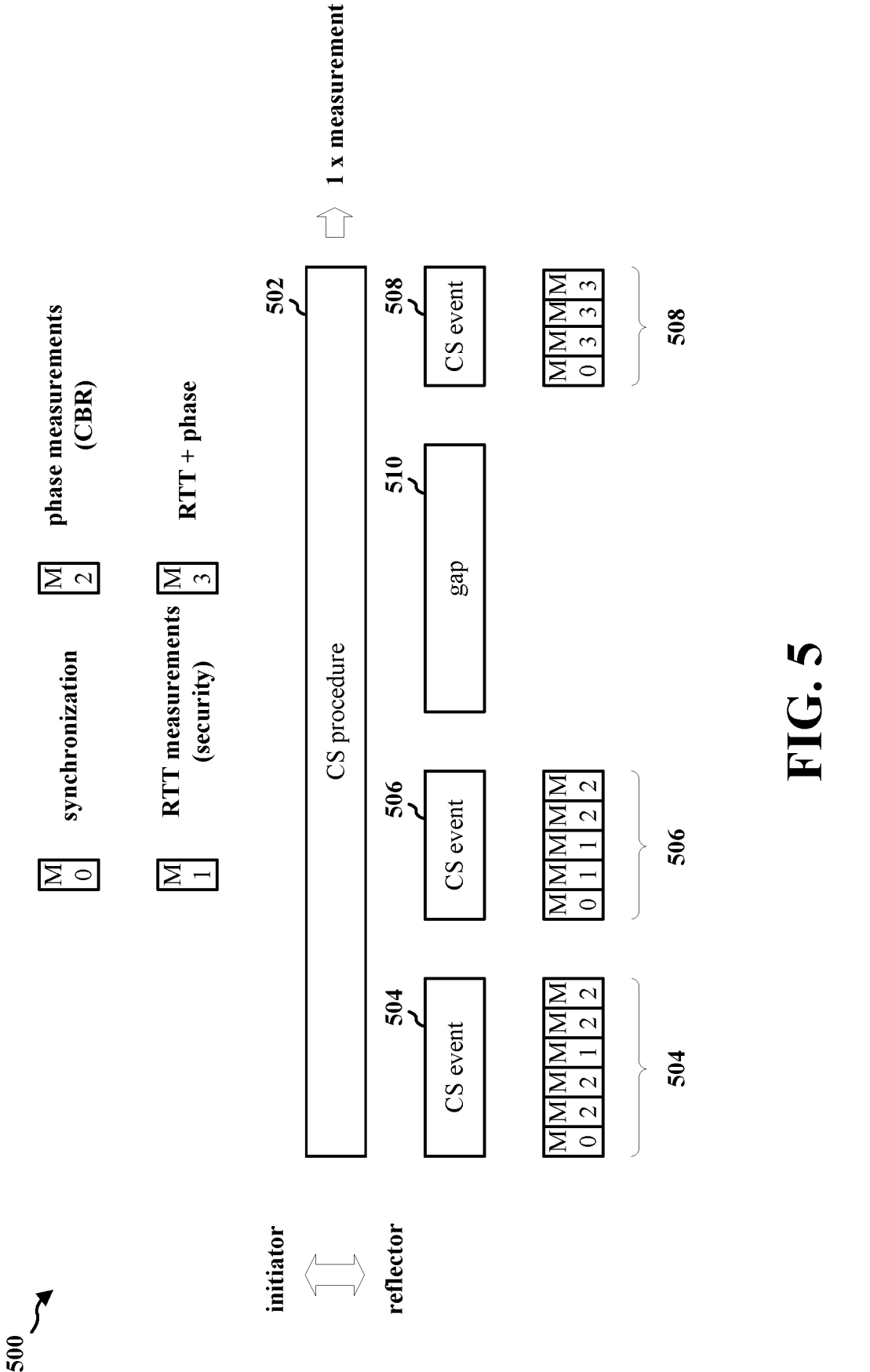
FIG. 5 is a diagram illustrating an example of positioning based on a channel sounding (CS) procedure.

FIG. 5 is a diagram 500 illustrating an example of positioning based on a channel sounding (CS) procedure. In some aspects, the CS procedure may be a Bluetooth channel sounding (BCS) procedure. In some aspects, the CS procedure may be a high accuracy distance measurement (HADM) procedure. The CS procedure may use carrier phase measurements to estimate a range between wireless devices.

For example, the CS procedure 502 may be used to measure a distance between an initiator device and a reflector device that are configured to perform a BCS procedure. The CS procedure 502 may include a set of events, for example the CS event 504, the CS event 506, and the CS event 508. Each of the CS event 504, the CS event 506, and the CS event 508 may start on a connection interval, such as a Bluetooth low energy (BLE) connection interval. In some aspects, an interval may be missed to allow for other activity. For example, the CS procedure 502 may be configured with a gap 510 that is used to allow for other activity, for example a unicast SRS or PRS transmission that is measured to calculate an RSSI value, or other BLE activity. Each CS event may include one or more CS steps. For example, mode 0 (M0) may indicate a synchronization step, mode 1 (M1) may indicate an RTT measurement step, mode 2 (M2) may indicate a phase measurement (e.g., carrier-based ranging (CBR) step, and mode 3 (M3) may indicate a step that includes both an RTT measurement and a phase measurement step. Each step may use a different Bluetooth channel, for example a channel from 0 to 78. Each of the CS event 504, the CS event 506, and the CS event 508 may start with an M0 synchronization step. The CS event 504 may include a synchronization step, followed by two CBR steps, followed by an RTT measurement step, followed by two CBR steps. The CS event 504 may include a synchronization step, followed by two RTT measurement steps, followed by two CBR steps. The CS event 508 may include a synchronization step, followed by three RTT/CBR steps. A single procedure, such as the CS procedure 502, may include a single measurement cycle of a length between 10 to 200 milliseconds. At the end of the CS procedure 502, measurements may be returned from the reflector device to the initiator device, for example by using BLE messaging. The initiator device may receive one or more measurements from the reflector device, for example an RTT measurement, an CBR measurement, a round trip phase (RTP) measurement, a bi-directional carrier phase measurement, an angle-of-arrival (AoA) measurement, a confidence level, and/or a security threat level.

Figure 6:
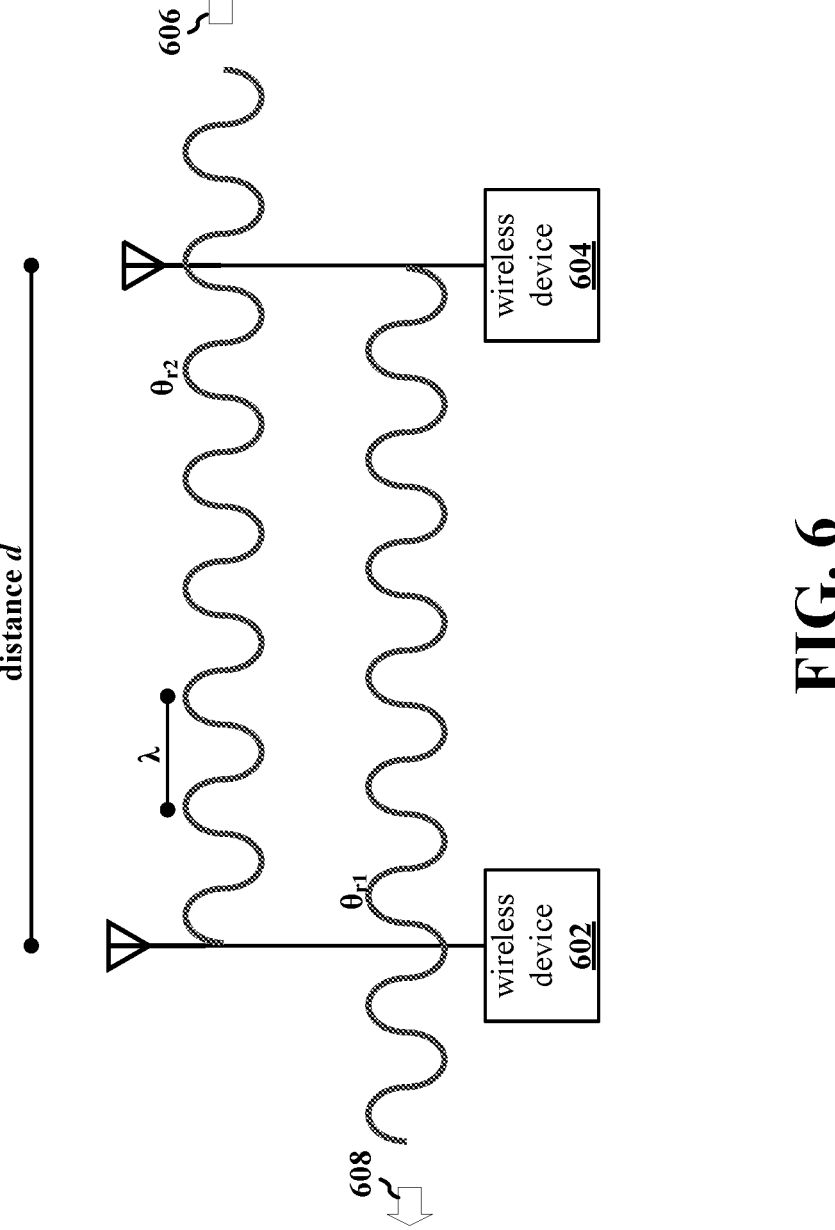
FIG. 6 is a diagram illustrating an example of positioning based on a round trip phase (RTP) measurement.

FIG. 6 is a diagram 600 illustrating an example of positioning based on a round trip phase (RTP) measurement. The carrier phase of a signal may be used as a ruler. For example, the wireless device 602 may transmit a carrier phase signal 606 at the wireless device 604. The wireless device 602 may have a local oscillator (LO) that remains running for coherency of the transmitted tone. The wireless device 604 may mix the received tone using its LO. The wireless device 604 may measure the phase $\theta_{r2}$ at a known time. Similarly, the wireless device 604 may transmit a carrier phase signal 608 at the wireless device 602. The wireless device 604 may have an LO that remains running for coherency of the transmitted tone. The wireless device 602 may mix the received tone using its LO. The wireless device 602 may measure the phase $\theta_{r1}$ at the same known time that the wireless device 604 measures the phase $\theta_{r2}$. Adding the phases together may remove the unknowns, resulting in an RTP measurement. In other words, the distance d may be calculated as $$d = \frac{\lambda}{4\pi}(\theta_{r2} + \theta_{r1}).$$

CBR measurements may be made between two wireless devices, such as the wireless device 602 and the wireless device 604, to estimate their range relative to one another. Each radio of the wireless device may measure the carrier phase transmitted by the other radio at a synchronized known time. One of the wireless devices may sum the two phases and repeat the process at multiple frequencies. The wireless device may unwrap the phase-sums and plot against frequency, to generate a gradient of a best-fit line. The gradient may be proportional to the range between the wireless devices. While CBR may result in an ambiguity (e.g., larger distances may be wrapped around to a smaller range estimate), such ambiguities may be resolved via unwrapping the phase-sums and plotting the phase-sums against the frequency.

Figure 7:
FIG. 7 is a diagram illustrating an example of positioning based on proximity devices having known locations.

FIG. 7 is a diagram 700 illustrating an example of positioning based on proximity devices having known locations. A server, such as the server 702, may control a plurality of proximity devices, such as the proximity device

706, the proximity device 708, the proximity device 710, the proximity device 712, the proximity device 714, the proximity device 716, the proximity device 718, the proximity device 720, the proximity device 722, the proximity device 724, the proximity device 726, the proximity device 728, the proximity device 730, the proximity device 732, the proximity device 734, the proximity device 736, the proximity device 738, and the proximity device 740. While the diagram 700 illustrates the server 702 as being directly connected to the proximity device 706, the proximity device 708, the proximity device 710, the proximity device 712, the proximity device 714, and the proximity device 716 via a wired connection, the server 702 may be connected to the proximity devices via one or more gateways through wired and/or wireless connections in other aspects. The proximity device 706, the proximity device 708, the proximity device 710, the proximity device 712, the proximity device 714, and the proximity device 716 may be energizers that may provide energy to passive proximity devices that are not directly coupled to a power source. For example, an energizer may energize RFID readers using a wireless signal, such as BLE. The proximity device 718, the proximity device 720, the proximity device 722, the proximity device 724, the proximity device 726, the proximity device 728, the proximity device 730, the proximity device 732, the proximity device 734, the proximity device 736, the proximity device 738, and the proximity device 740 may be passive proximity devices that are not directly coupled to a power source, and may receive power via a wireless signal, such as BLE. Such passive proximity devices may be, for example, passive RFID readers that receive energy via a continuous wave (CW) signal, and may reflect/transmit beacon signals based on a received signal (e.g., a CW signal) from an energizer. The proximity devices may include ESL devices, which may be coupled to a shelf in a facility. The ESL devices may be controlled and scheduled by an ESL subsystem of access points (APs), for example the AP 704 and the AP 705. The AP 704 and the AP 705 may also be coupled to the server 702.

The proximity device 706, the proximity device 708, the proximity device 710, the proximity device 712, the proximity device 714, and the proximity device 716 may provide energy to the proximity device 718, the proximity device 720, the proximity device 722, the proximity device 724, the proximity device 726, the proximity device 728, the proximity device 730, the proximity device 732, the proximity device 734, the proximity device 736, the proximity device 738, and the proximity device 740. The proximity device 718, the proximity device 720, the proximity device 722, the proximity device 724, the proximity device 726, the proximity device 728, the proximity device 730, the proximity device 732, the proximity device 734, the proximity device 736, the proximity device 738, and the proximity device 740 may be located in discrete columns and rows in a facility. For example, the proximity device 718, the proximity device 720, the proximity device 722, and the proximity device 724 may be in a first common row; the proximity device 726, the proximity device 728, the proximity device 730, and the proximity device 732 may be in a second common row; and the proximity device 734, the proximity device 736, the proximity device 738, and the proximity device 740 may be in a third common row. Similarly, the proximity device 718, the proximity device 726, and the proximity device 734 may be in a first common column; the proximity device 720, the proximity device 728, and the proximity device 736 may be in a second common column; the proximity device 722, the proximity device 730, and the proximity device 738 may be in a third common column; and the proximity device 724, the proximity device 732, and the proximity device 740 may be in a fourth common column.

The proximity devices may transmit beacon signals that are received by a target device to calculate a position of the target device, such as the target device 742 and/or the target device 744. In some aspects, a target device may include a user equipment (UE), such as a smartphone, a machine in a warehouse (e.g., forklifts, pallet movers), or a locator device on a pallet. For example, a set of proximity devices may transmit beacon signals to the target device 742, the target device 742 may receive and measure the beacon signals, and may calculate its position based on the measurements, assuming that the target device 742 knows the location of each of the proximity devices that transmit the beacon signals. In some aspects, a beacon signal may include an indicator of the location of the proximity device. In other aspects, a beacon signal may include an indicator of a proximity device (e.g., a unique identifier), and a wireless device, such as the AP 704 or the proximity device 706, may transmit a map to the target device that associates proximity device indicators with locations. The target device may then calculate its location based on the beacon signal and the map by correlating the indicator with locations on the map.

In some aspects, a target device, such as the target device 742 and/or the target device 744, may estimate the range between the target device and a set of proximity devices based on RSSI values. For example, for a target device, let $r_1 \geq r_2 \geq \ldots r_M$ denote the RSSI values for M proximity devices (e.g., ESLs) in descending order of RSSI. The target device may calculate its position by a weighted average of the ESL positions, where the weights are a function of the RSSI values. In other words, $$\hat{P} = \frac{\sum_{k=1}^{M} w_k \cdot P_k}{\sum_{k=1}^{M} w_k}$$

where $$w_k = 2^{\frac{r_k - r_1}{\lambda}}.$$

$\lambda$ may be a factor that determines a priority level for how the RSSI measurements may be ranked and translated to the weights. In some aspects, the server 702 may configure the scheduling for beacon signals and measurements, such that the server 702 configures the values for $\lambda$ and for M.

In some aspects, the server 702 may select a suitable or desired subset of a first set of proximity devices (e.g., ESLs) that are used to transmit beacon signals so that a target device (e.g., the target device 742) may calculate a fine positioning location. The server 702 may select the suitable or desired subset based on a coarse estimate calculated based on beacon signals transmitted from a second set of proximity devices (e.g., energizers). For example, the first set of proximity devices may include the proximity device 718, the proximity device 720, the proximity device 722, the proximity device 724, the proximity device 726, the proximity device 728, the proximity device 730, the proximity device 732, the proximity device 734, the proximity device 736, the proximity device 738, and the proximity device 740 (e.g., ESLs), and the second set of proximity devices may include the proximity device 706, the proximity device 708, the proximity device 710, the proximity device 712, the proximity device 714, and the proximity device 716 (e.g., energizers). The server 702 may schedule the second set of proximity devices (via the AP 704 and/or the AP 705, or directly via a wired and/or wireless connection) to transmit a set of beacon signals to the target device 742. The target device 742 may measure a signal strength (e.g., DL-RSSI, HADM, BCS) of the beacon signals from the second set of proximity devices. The target device 742 may calculate a coarse estimate of its location based on the measured beacon signals, and may transmit an indicator of the coarse estimate to the server 702 (via the AP 704, the AP 705, or via one of the second set of proximity devices). The target device 742 may request for a suitable or desired subset of ESLs to transmit beacon signals to compute a finer estimate. The server 702 may select a subset (e.g., the proximity device 718, the proximity device 720, the proximity device 726, and the proximity device 728) of the first set of proximity devices to transmit beacon signals to the target device 742. The target device 742 may measure a signal strength of the second set of beacon signals from the subset of the first set of proximity devices to calculate a fine estimate of its location using the infrastructure of the first set of proximity devices. In some aspects, the target device 742 may fuse calculations across measurements from both a subset of the first set of proximity devices and a subset of the second set of proximity devices to calculate a final position estimate. For example, the server 702 may also select the proximity device 712 and the proximity device 710 to transmit beacon signals. The types of measurements may be different. For example, the target device 742 may calculate its location via the second set of beacon signals from the subset of the first set of proximity devices via DL-RSSI measurements, and the target device 742 may calculate its location via the first set of beacon signals from the subset of the second set of proximity devices via BCS measurements. In some aspects, the server 702 may transmit an indicator of a boundary region/threshold beyond which the selected subset of the first set of proximity devices would be updated. In other words, the estimate of the location of the target device 742 may become more erroneous as the target device 742 approaches the boundary of the region formed by the subset of the proximity devices, or moves past the boundary of the region formed by the subset of the proximity devices. The server 702 may configure the second set of proximity devices to periodically transmit a set of beacon signals. As the target device 742 receives the periodically transmitted set of beacon signals, the target device 742 may calculate a course location of its position. In response to the target device 742 determining that it has moved outside the region (or exceeded the threshold), the target device 742 may transmit a request to the server 702 for a new suitable or desired subset of proximity devices. The server 702 may then configure a new subset of the first set of proximity devices to transmit beacon signals to the target device 742 to calculate the fine location of its position.

In some aspects, a target device, such as the target device 742 and/or the target device 744, may be configured to perform positioning based on different types of measurements, and/or different types of beacon signals. For example, the target device 742 may be configured to calculate its location based on both DL-RSSI and BCS. The server 702 may schedule transmissions from the second set of proximity devices (e.g., HADM packets) and from the subset of the first set of proximity devices (e.g., DL packets) to assist in positioning fusion at the target device 742. In some aspects, the server 702 may couple the transmissions tightly in the time-domain, such as a periodic set of transmissions including a DL packet transmission from the subset of the first set of proximity devices followed by three HADM packets transmitted from the second set of proximity devices. In other words, the server 702 may interleave the HADM transmissions between DL-RSSI transmissions as per the ESL beaconing rate(s). Gaps between DL-RSSI transmissions may be used for scheduling CS event(s). In some aspects, the HADM packets may include 79 bidirectional exchanges over a MHz channels, while the DL-RSSI packets may be unidirectional transmissions over 2 MHz channels. A non-overlapping pattern of 79 channels may be overlapped in time. Fusion between DL-RSSI and HADM measurements may include the use of both DL-RSSI and HADM measurements to calculate a fine location estimate. Any suitable mathematical formulations or optimizations may be utilized, for example coarse estimates via HADM and fine estimates via DL-RSSI, or vice-versa. The location calculation based on the DL-RSSI measurements may be used to corroborate the location calculation based on HADM. In some aspects, the server 702 may configure additional RTT measurements if the DL-RSSI calculation and the HADM calculation are not corroborated (e.g., for security purposes), and may not configure additional RTT measurements if the DL-RSSI calculation and the HADM calculation are corroborated. This may reduce overhead and energy consumption by the target device 742.

In some aspects, a target device may transmit beacon signals that are received by a proximity device to calculate a position of the target device, such as the target device 742 and/or the target device 744. For example, the target device 744 may include a passive RFID device that receives a CW signal from an energizer, and transmits a beacon for receipt and measurement by a proximity device. A set of proximity devices may measure the beacon signal from the target device 744 and may calculate the position of the target device 744 based on the measurements.

In some aspects, the server 702 may select a suitable or desired subset of a first set of proximity devices (e.g., ESLs) to measure beacon signals transmitted by a target device (e.g., the target device 742). A device (e.g., the server 702, the AP 704, the AP 705, one of the first set of proximity devices) may calculate a fine estimate of the location of the target device based on the measurements. The server 702 may select the suitable or desired subset based on a coarse estimate calculated based on measurements of beacon signals transmitted by the target device and received by a second set of proximity devices (e.g., energizers). For example, the first set of proximity devices may include the proximity device 718, the proximity device 720, the proximity device 722, the proximity device 724, the proximity device 726, the proximity device 728, the proximity device 730, the proximity device 732, the proximity device 734, the proximity device 736, the proximity device 738, and the proximity device 740 (e.g., ESLs), and the second set of proximity devices may include the proximity device 706, the proximity device 708, the proximity device 710, the proximity device 712, the proximity device 714, and the proximity device 716 (e.g., energizers). The target device 742 may transmit a set of beacon signals. In some aspects, the target device 742 may periodically transmit the set of beacon signals. In some aspects, the server 702 may schedule the second set of proximity devices to periodically transmit a set of energizing signals (e.g., CW signals) that the target device (and/or other devices, such as ESLs) may harvest energy from to transmit the set of beacon signals. In other words, the target device 742 may be a passive IoT device with limited battery and computational capability, which may be configured to transmit a beacon in response to receiving an energizing signal. At least some of the second set of proximity devices may receive and measure the set of beacon signals (e.g., UL-RSSI, HADM, BCS) from the target device 742. The measurements may be aggregated by a device (e.g., the server 702, the AP 704, the AP 705, one of the first set of proximity devices) to calculate a coarse estimate of the location of the target device 742. The coarse estimate may be relayed to the server 702. The server 702 may select a subset of the first set of proximity devices (e.g., the proximity device 718, the proximity device 720, the proximity device 726, and the proximity device 728) to wake up and listen (e.g., switch to an Rx listening mode) for beacon transmissions from the target device 742. For example, the server 702 may configure the second set of proximity devices to transmit energizing signals with identifiers of the subset of the first set of proximity devices, such that the now-energized subset of the first set of proximity devices switch to an Rx listening mode. In some aspects, the server 702 may configure the target device 742 and the subset of the first set of proximity devices to synchronize with the second set of proximity devices (e.g., following a common timing grid) to avoid, or minimize, interference with one another. The subset of the first set of proximity devices may measure the set of beacon signals from the target device 742. The measurements may be aggregated by a device to calculate a fine estimate of the location of the target device 742. The fine estimate may then be relayed to the server 702. In some aspects, a device may fuse calculations across measurements from both a subset of the first set of proximity devices and a subset of the second set of proximity devices to calculate a final position estimate (e.g., BCS measurements from the second set of proximity devices and UL-RSSI measurements from the subset of the first set of proximity devices. In some aspects, the server 702 may calculate a boundary region/threshold beyond which the selected subset of the first set of proximity devices should be updated. In response to the server 702 determining that the target device 742 has moved outside the region (or exceeded the threshold), the server 702 may select a new subset of the first set of proximity devices to wake up/listen for beacon transmissions from the target device 742 to calculate the fine location of the target device 742.

In some aspects, a device (e.g., the server 702, the AP 704, the AP 705, one of the first set of proximity devices) calculating the location of the target device 742 may be configured to perform positioning based on different types of measurements, and/or different types of beacon signals. For example, the server 702 may be configured to calculate the location of the target device 742 based on both UL-RSSI and BCS. The server 702 may schedule transmissions from the target device 742 (e.g., HADM packets and UL packets) to assist in positioning fusion at the server 702. In some aspects, the server 702 may couple the transmissions tightly in the time-domain, such as a periodic set of transmissions including an UL packet transmission from the target device 742 followed by three HADM packets transmitted from the target device 742. In other words, the server 702 may interleave the HADM transmissions between UL-RSSI transmissions. Gaps between UL-RSSI transmissions may be used for scheduling CS event(s). In some aspects, the HADM packets may include 79 bidirectional exchanges over a MHz channels, while the DL-RSSI packets may be unidirectional transmissions over 2 MHz channels. A non-overlapping pattern of 79 channels may be overlapped in time. Fusion between UL-RSSI and HADM measurements may include the use of both UL-RSSI and HADM measurements to calculate a fine location estimate. Any suitable mathematical formulations or optimizations may be utilized, for example coarse estimates via HADM and fine estimates via UL-RSSI, or vice-versa. The location calculation based on the UL-RSSI measurements may be used to corroborate the location calculation based on HADM In some aspects, the server 702 may configure additional RTT measurements if the UL-RSSI calculation and the HADM calculation are not corroborated (e.g., for security purposes), and may not configure additional RTT measurements if the UL-RSSI calculation and the HADM calculation are corroborated. This may reduce overhead and energy consumption by the target device 742.

In some aspects, interference may occur when a set of proximity devices receives UL signals from the target device 742. For example, a plurality of devices may transmit signals when the target device 742 transmits its UL signals, causing interference when the set of proximity devices attempt to measure UL signals from the target device 742. In some aspects, the server 702 may configure an energizing signal from a set of energizers to control the operation of the target device 742, for example by inserting, removing, or configuring a tone signature within the energizing signal. A tone signature may be a set of tones of an energizing signal that indicate to a target device an attribute to use for transmitting a set of beacon signals. For example, a tone signature may indicate to the target device 742 to use one or more channels for transmitting a set of beacon signals. In another example, a tone signature may indicate to the target device 742 to select a random channel from a set of channels for transmitting a set of beacon signals. In another example, a tone signature may indicate to the target device 742 to use one or more timing offsets for transmitting a set of beacon signals. In another example, a tone signature may indicate to the target device 742 to randomly select from a set of timing offsets (i.e., a random backoff factor) for transmitting a set of beacon signals. In some aspects, the set of timing offsets may be indicated in terms of timing slots (e.g., 1.25 milliseconds each) or may be of finer granularity (e.g., smaller offsets within a slot). In some aspects, the server 702 may configure the subset of the first set of proximity devices to monitor for the set of beacon signals to monitor the full set of channels or the full set of timing offsets that the target device 742 selects from.

The server 702 may select a subset of the first set of beacon signals to transmit a set of beacon signals or to receive and measure a set of beacon signals. The server 702 may select the number of devices for the subset based on an estimated density of devices within the area of the target device. For example, the server 702 may be configured to have a greater number of devices selected for the subset based on the estimated density of devices within a zone of the target device being greater or equal to a threshold value, and/or may be configured to have a smaller number of devices selected for the subset based on the estimated density of devices within the zone of the target device being less than or equal to the threshold value. In other words, the server 702 may increase or decrease the number of the subset of the first set of beacon signals selected as per the perceived density of devices. Similarly, the listening rate may be increased or decreased accordingly. In other words, the server 702 may be configured to have a higher listening rate based on the estimated density of devices within a zone of the target device being greater or equal to a threshold value, and/or may be configured to have a smaller listening rate based on the estimated density of devices within the zone of the target device being less than or equal to the threshold value. Where a large number is selected (e.g., the number is greater or equal to a second threshold value), the server 702 may reject outlier measurements due to the presence of greater interference.

Figure 8:
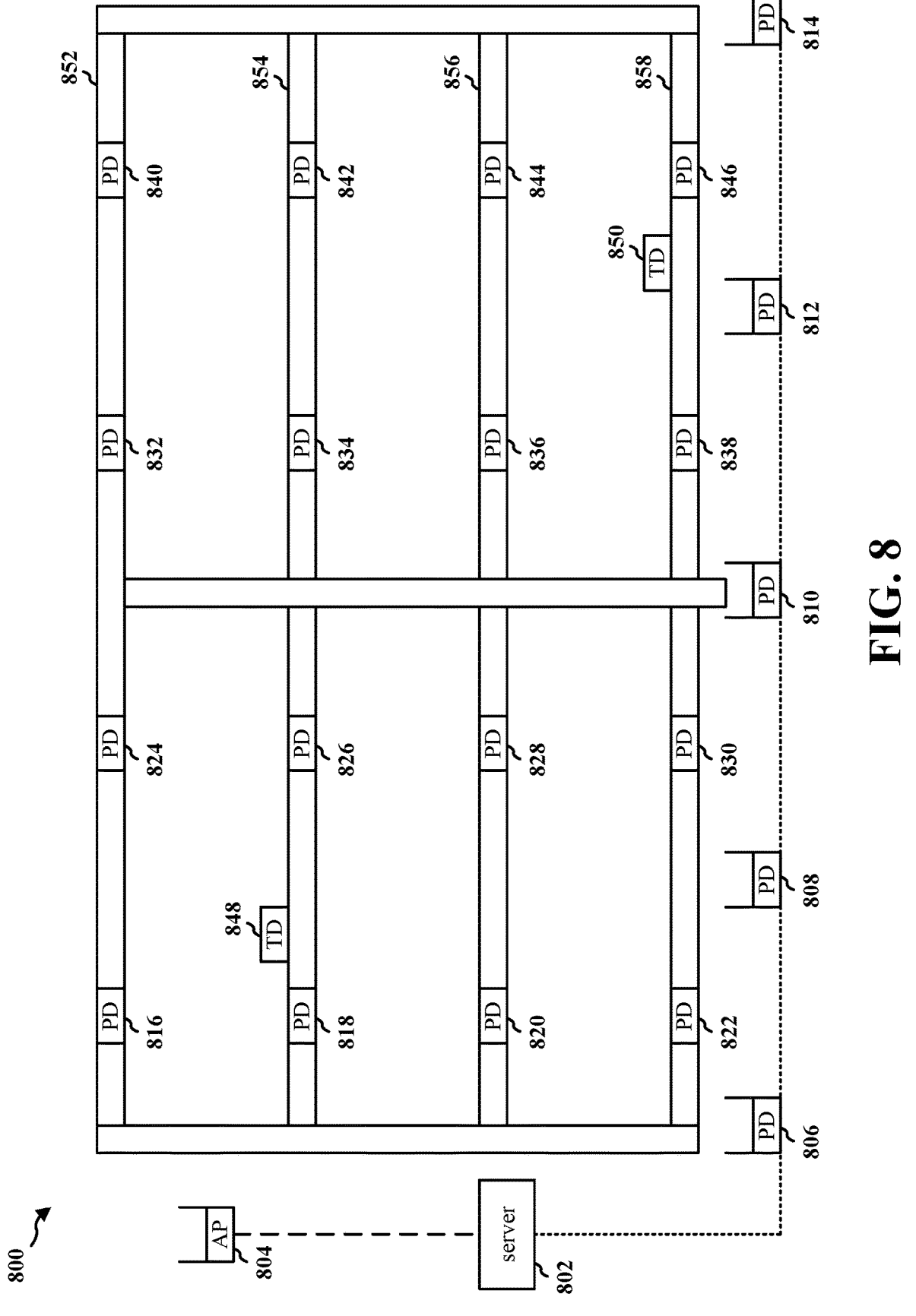
FIG. 8 is a diagram illustrating another example of positioning based on proximity devices having known locations.

FIG. 8 is a diagram 800 illustrating another example of positioning based on proximity devices having known locations. A server, such as the server 802, may control a plurality of proximity devices, such as the proximity device 806, the proximity device 808, the proximity device 810, the proximity device 812, the proximity device 814, the proximity device 816, the proximity device 818, the proximity device 820, the proximity device 822, the proximity device 824, the proximity device 826, the proximity device 828, the proximity device 830, the proximity device 832, the proximity device 834, the proximity device 836, the proximity device 838, the proximity device 840, the proximity device 842, the proximity device 844, and the proximity device 846. Some of the proximity devices may be ESLs coupled to shelves, such as the shelf 852, the shelf 854, the shelf 856, or the shelf 858. The ESLs may be controlled by an ESL AP, such as the AP 804. The ESLs may be energized by a plurality of energizers, for example the proximity device 806, the proximity device 808, the proximity device 810, the proximity device 812, and the proximity device 814 may be energizers. The proximity device 816, the proximity device 818, the proximity device 820, the proximity device 822, the proximity device 824, the proximity device 826, the proximity device 828, the proximity device 830, the proximity device 832, the proximity device 834, the proximity device 836, the proximity device 838, the proximity device 840, the proximity device 842, the proximity device 844, and the proximity device 846 may be ESLs. The energizers may transmit energizing signals that power the ESLs.

In some aspects, for example when a target device is close to one side of an aisle of shelves, the strongest measured beacon signals may be associated with ESLs on one side of the aisle. As a result, a calculated weighted average position of the target object may lie within the gondola (in the same plane as the ESLs), which may interfere with an accurate estimate of the perpendicular distance of the target object from the gondola. For example, the target device 848 may be located on the shelf 854, causing beacon signals transmitted by the proximity device 818 and the proximity device 826 on the shelf 854 to be the strongest measured beacon signals by the target device 848. The target device 848 may then calculate its position to be within the shelf 854 instead of on top of the shelf 854 due to measurements of beacon signals from proximity devices on the shelf 852 and the shelf 856 being muffled by weighting.

In some aspects, beacon signals transmitted by a proximity device may include a location attribute, for example a row of a shelf, a column of a shelf, or a height of a shelf. A target device, such as the target device 848 or the target device 850, that receives a set of beacon signals from a set of proximity device may then identify each beacon signal by its associated location attribute. In some aspects, a location attribute may include a gondola identifier (ID) and/or a shelf ID. The target device receiving the beacon signals may select a subset of measurements (e.g., a subset of RSSI measurements) from proximity devices for each shared location attribute (e.g., two strongest signals from each shelf, four strongest signals from each aisle, two strongest signals from each row, column, and height). Selecting different shelves may assist the target device in calculating its vertical position in a more accurate manner, and selecting different aisles may assist the target device in calculating its horizontal position in a more accurate manner. In some aspects, the target device may perform numerical computations to fit a line/plane to determine which proximity devices are located on each line/plane. However, since such computations may use more resources (i.e., higher complexity, higher computational burden), the target device may rely on prior information regarding its perpendicular distance to a line/plane to select a proportionate number of proximity devices for each line/plane.

In some aspects, measurements of beacon signals received by a proximity device may be tagged with a location attribute. The proximity device may transmit the measurement with the location attribute such that a device (e.g., the server 802, the AP 804, one of the plurality of energizers) calculating a location of a target object, such as the target device 848 or the target device 850, may know the location of the proximity device relative to other proximity devices based on the location attribute. The device calculating the location of the target object (e.g., the server 802), may use a heuristic based on signal strength indicators (RSSI values) may be used to determine whether the target device is located along a line/plane. For example, the server 802 may calculate an average RSSI per shelf or per gondola. In some aspects, the server 802 may select measurements from distinct shared location attributes (e.g., distinct shelves, distinct aisles) for calculating the location of the target object. For example, the server 802 may select measurements from distinct aisles in response to determining that the target device may be located between two aisles. In some aspects, the server 802 may select measurements from distinct shelves for calculating the location of the target object. For example, the server 802 may select measurements from distinct shelves in response to determining that the target device may be located between two shelves.

Figure 9:
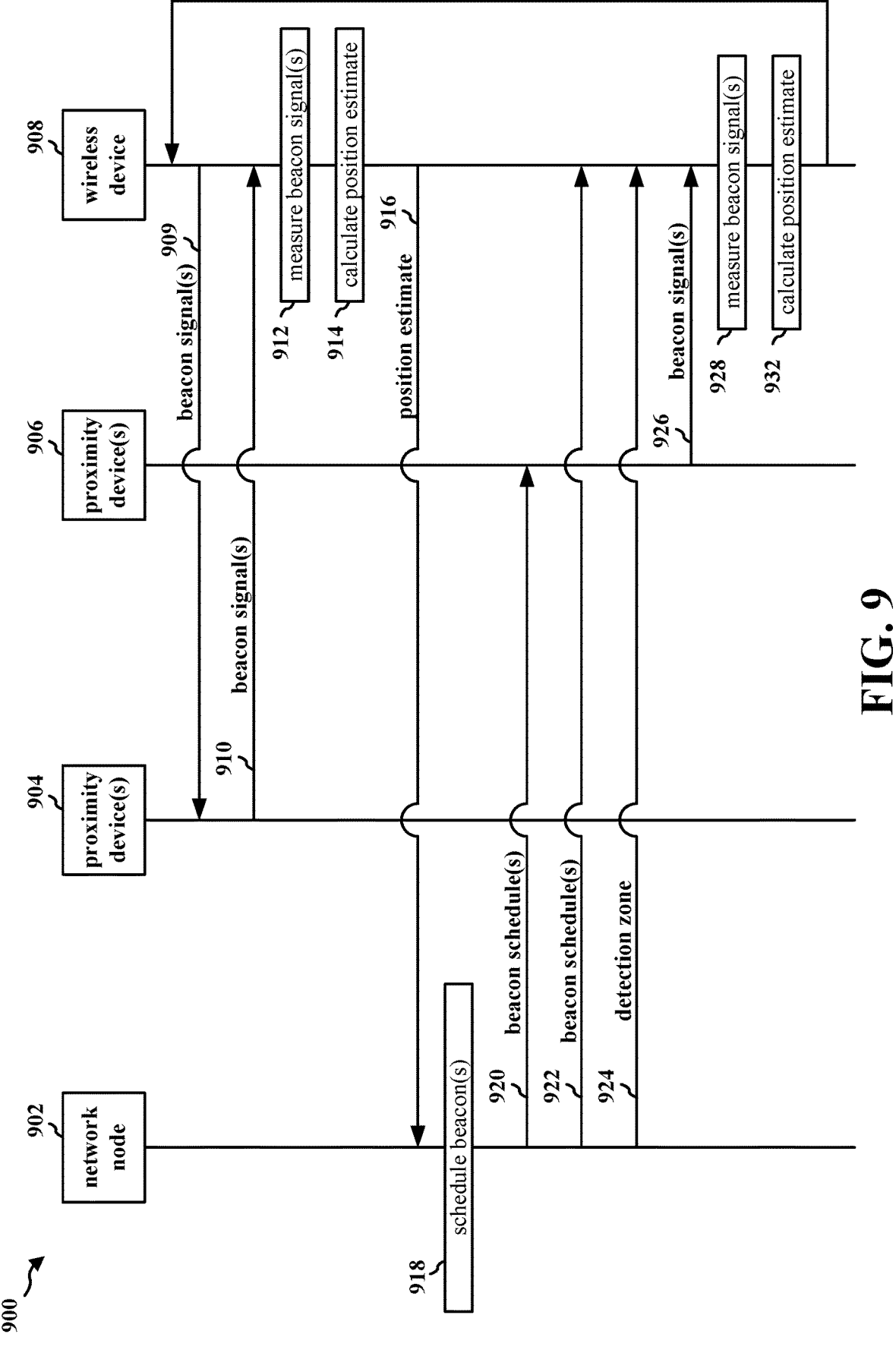
FIG. 9 is a connection flow diagram illustrating an example of positioning based on proximity devices having known locations.

FIG. 9 is a connection flow diagram 900 illustrating an example of positioning based on proximity devices having known locations. A network node 902 may communicate with a set of proximity devices 904 and a set of proximity devices 906 to assist a wireless device 908 in calculating its position. The network node 902 may be any device suitable to coordinate positioning among a plurality of devices, for example a server, a core network component, an LMF, or an AP. The set of proximity devices 904 may be a set of energizers that provide energy to the set of proximity devices 906. The set of proximity devices 906 may be a set of ESLs that receive energy from the set of proximity devices 904. The wireless device 908 may be a UE capable of calculating its position based on beacon signals/positioning signals received from proximity devices having known locations. While the connection flow diagram 900 shows transmissions of signals between the network node 902 and the set of proximity devices 904, the set of proximity devices 906, and the wireless device 908, some of the signals may be transmitted via intermediary devices, for example via an AP and/or an energizer.

The set of proximity devices 904 may transmit a set of beacon signals 910 to the wireless device 908. The wireless device 908 may receive the set of beacon signals 910 from the set of proximity devices 904. In some aspects, a server device, for example a remote server functionally connected to the Internet, a set of cloud devices, or the network node 902, may configure the set of proximity devices 904 to transmit the set of beacon signals 910. In some aspects, the set of proximity devices 904 may be configured to periodically transmit the set of beacon signals 910, for example once every minute. In some aspects, the network node 902 may configure a subset of the set of proximity devices 904 to transmit the set of beacon signals 910, for example based on a geometry of a coarse position of the wireless device 908. The network node 902 may receive a coarse position of the wireless device 908, for example via a request transmission from the wireless device 908 including an indicator of the coarse position, and may select a subset of the set of proximity devices 904 that surround the coarse position, for good dilution of precision. The network node 902 may transmit a configuration (e.g., a beacon transmission schedule) to the set of proximity devices 904. The configuration may schedule different subsets of the set of proximity devices 904 to operate at different time slots and/or channels to minimize interference between the set of proximity devices 904.

At 912, the wireless device 908 may measure the set of beacon signals 910. For example, the wireless device 908 may measure a set of DL-RSSI or a set of HADM/BCS. At 914, the wireless device 908 may calculate a position estimate of the wireless device 908 based on the measurements taken at 912, and the known locations of the set of proximity devices 904. This may be a coarse estimate of the wireless device 908. The wireless device 908 may transmit an indicator of the position estimate 916 to the network node 902. The network node 902 may receive the indicator of the position estimate 916 from the wireless device 908.

In some aspects, the wireless device 908 may transmit a set of beacon signals 909 to the set of proximity devices 904 prior to receiving the set of beacon signals 910. For example, the set of beacon signals 909 may be a set of UL-SRS and the set of beacon signals 910 may be a set of DL-PRS transmitted in response to the set of proximity devices 904 receiving the set of UL-SRS. At 912, the wireless device 908 may measure a set of RTT measurements based on the RTT of the UL-SRS and the DL-PRS. In another example, the set of beacon signals 909 may include a set of BLE signals and the set of beacon signals 910 may be a set of BLE signals transmitted in response to the set of proximity devices 904 receiving the set of BLE signals from the wireless device 908. At 912, the wireless device 908 may measure a set of bi-directional carrier phase measurements, or a set of RTP measurements based on the BLE signals received from the set of proximity devices 904.

At 918, the network node 902 may schedule beacons to be transmitted by the set of proximity devices 906 at the wireless device 908 for a fine position estimate. The network node 902 may select a subset of the set of proximity devices 906 based on the indicator of the position estimate 916 received by the wireless device 908. In some aspects, the network node 902 may store last known locations of devices in a vicinity around the wireless device 908. For example, the network node 902 may compute locations of wireless devices based on RSSI measurements received from the set of proximity devices 904 and/or the set of proximity devices 906. As such the network node 902 may be aware of a perceived density of devices capable of interfering with wireless signals about the wireless device 908, and may schedule the beacons based on the perceived density. The network node 902 may select the subset of the set of proximity devices 906 based on a geometry of a coarse position of the wireless device 908. The network node 902 may select a subset of the set of proximity devices 906 that surround the coarse position indicated by the position estimate 916, for good dilution of precision. The network node 902 may schedule different smaller subsets of the subset of the set of proximity devices 906 to operate at different time slots and/or channels to minimize interference between the set of proximity devices 906. Since some of the set of proximity devices 906 may have limited power resources (e.g., smaller battery for an ESL), some of the subset of the set of proximity devices 906 may run out of power resources faster than others of the subset of the set of proximity devices 906. Accordingly, the network node 902 may track the power consumption of the set of proximity devices 906 to uniformly distribute, or uniformly conserve power among the subset of the set of proximity devices 906.

The network node 902 may transmit a set of beacon schedules 920 to the subset of the set of proximity devices 906. The network node may transmit at least some indicators of the set of beacon schedules 920 as the set of beacon schedules 922 to the wireless device 908 so that the wireless device 908 knows when to receive the beacons from the subset of the set of proximity devices 906. The subset of the set of proximity devices 906 may transmit a set of beacon signals 926 at the wireless device 908 based on the set of beacon schedules 920.

At 928, the wireless device 908 may measure the set of beacon signals 926. At 932, the wireless device 908 may calculate a position estimate of the wireless device 908 based on the measurements taken at 928, and based on the known locations of the set of proximity devices 906. This may be a fine estimate of the wireless device 908. In some aspects, the wireless device 908 may transmit a report of the calculated location, for example a transmission to the network node 902 or a transmission to an LMF. The fine estimate may allow the network node 902 to keep track of the movements of the wireless device 908.

In some aspects, the network node 902 may transmit an indicator of a detection zone 924 to the wireless device 908. The detection zone may be a zone associated with the subset of the set of proximity devices 906. If the wireless device 908 travels outside of the detection zone, the network node 902 may be configured to select a new subset of the set of proximity devices 906. The set of proximity devices 904 may be configured to periodically transmit the set of beacon signals 910. At 914, the wireless device 908 may detect that it has traveled outside of the detection zone, and may transmit an indicator of the position estimate 916 to the network node 902, enabling for the network node 902 to select a new subset of the set of proximity devices 906 at 918.

In some aspects, the network node 902 may calculate a velocity of the wireless device 908, for example via the position estimate 916 or the position estimate calculated at 932. In some aspects, the network node 902 may reselect the subset of the set of proximity devices 906 to preemptively schedule, awaken, or otherwise ready the reselected subset of the set of proximity devices 906, effectively moving the bubble of ready devices towards the calculated direction of the wireless device 908. In some aspects, the coarse estimate based on the position estimate 916 may be off by a factor. The network node 902 may calculate the bubble to be large enough to accommodate the error factor. In other words, the network node 902 may select the subset of the set of proximity devices 906 based at least on the position estimate 916 and the calculated error factor.

Figure 10:
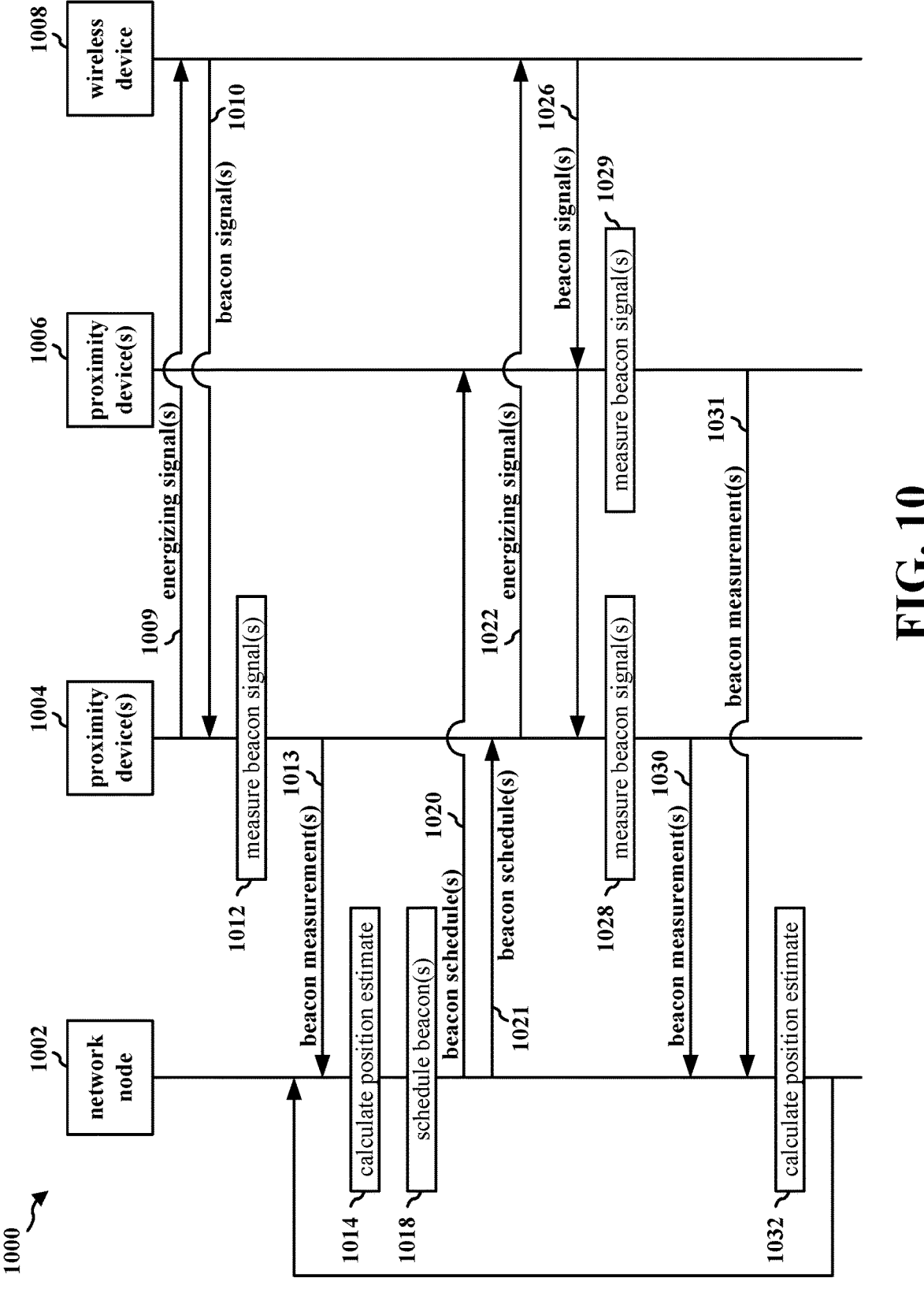
FIG. 10 is a connection flow diagram illustrating an example of positioning based on proximity devices having known locations.

FIG. 10 is a connection flow diagram 1000 illustrating an example of positioning based on proximity devices having known locations. A network node 1002 may communicate with a set of proximity devices 1004 and a set of proximity devices 1006 to calculate a position of the wireless device 1008. The network node 1002 may be any device suitable to coordinate positioning among a plurality of devices, for example a server, a core network component, an LMF, or an AP. In some aspects, the network node 1002 may be one of set of proximity devices 1004 or one of the set of proximity devices 1006. The set of proximity devices 1004 may be a set of energizers that provide energy to the set of proximity devices 1006. The set of proximity devices 1006 may be a set of ESLs that receive energy from the set of proximity devices 1004. The wireless device 1008 may be a passive RFID device capable of periodically transmitting beacons, for example in response to receiving a CW signal from at least one of the set of proximity devices 1004. In some aspects, the wireless device 1008 may be a powered UE. The powered UE may be a UE having a type or a state that is associated with a low resource threshold, for example a UE having a low power state or a UE having a low number of processing resources or capability to perform positioning. While the connection flow diagram 1000 shows transmissions of signals between the network node 1002 and the set of proximity devices 1004, and the set of proximity devices 1006, some of the signals may be transmitted via intermediary devices, for example via an AP and/or an energizer.

In some aspects, a server device, for example a remote server functionally connected to the Internet, a set of cloud devices, or the network node 1002, may configure the set of proximity devices 1004 to transmit the set of energizing signals 1009 to the wireless device 1008, which may trigger the wireless device 1008 to transmit the set of beacon signals 1010. In some aspects, the set of proximity devices 1004 may be configured to periodically transmit the set of energizing signals 1009, for example once every minute. In some aspects, the network node 1002 may configure a subset of the set of proximity devices 1004 to transmit the set of energizing signals 1009, for example based on a geometry of a coarse position of the wireless device 1008. The network node 1002 may receive a coarse position of the wireless device 1008, for example via a core network, one or more location servers, an LMF, or a request transmission from the wireless device 1008 including an indicator of the coarse position, and may select a subset of the set of proximity devices 1004 that surround the coarse position, for good dilution of precision. The network node 1002 may transmit a configuration (e.g., a beacon transmission schedule) to the set of proximity devices 1004. The wireless device 1008 may transmit a set of beacon signals 1010 to the set of proximity devices 1004. The set of proximity devices 1004 may receive the set of beacon signals 1010 from the wireless device 1008. The wireless device 1008 may transmit the set of beacon signals 1010 to the set of proximity devices 1004 based on receiving the set of energizing signals 1009.

In some aspects, interference may occur when the set of proximity devices 1004 receives the set of beacon signals 1010 from the wireless device 1008. For example, a plurality of devices may transmit signals when the wireless device 1008 transmits the set of beacon signals 1010, causing interference when the set of proximity devices 1004 attempt to measure the set of beacon signals 1010 from the wireless device 1008. In some aspects, the network node 1002 may configure the set of energizing signals 1009 from at least some of the set of proximity devices 1004 to control the operation of the wireless device 1008, for example by inserting, removing, or configuring a tone signature within the energizing signal. A tone signature may be a set of tones of an energizing signal that indicate to a wireless device an attribute to use for transmitting a set of beacon signals. For example, a tone signature may indicate to the wireless device 1008 to use one or more channels for transmitting the set of beacon signals 1010. In another example, a tone signature may indicate to the wireless device 1008 to select a random channel from a set of channels for transmitting the set of beacon signals 1010. In another example, a tone signature may indicate to the wireless device 1008 to use one or more timing offsets for transmitting the set of beacon signals 1010. In another example, a tone signature may indicate to the wireless device 1008 to randomly select from a set of timing offsets (i.e., a random backoff factor) for transmitting the set of beacon signals 1010. In some aspects, the set of timing offsets may be indicated in terms of timing slots (e.g., 1.25 milliseconds each) or may be of finer granularity (e.g., smaller offsets within a slot). In some aspects, the network node 1002 may configure at least a subset of the set of proximity devices 1004 to monitor for the set of beacon signals 1010 by monitoring the full set of channels or the full set of timing offsets that the wireless device 1008 selects from.

At 1012, the set of proximity devices 1004 may measure the set of beacon signals 1010. For example, the set of proximity devices 1004 may measure a set of UL-RSSI or a set of HADM/BCS. The set of proximity devices 1004 may transmit the set of beacon measurements 1013 to the network node 1002. In other words, one device may aggregate beacon measurements collected for the set of beacon signals 1010. At 1014, the network node 1002 may calculate a position estimate of the wireless device 1008 based on the measurements taken at 1012, and the known locations of the set of proximity devices 1004. This may be a coarse estimate of the wireless device 1008.

At 1018, the network node 1002 may schedule beacons to be received by the set of proximity devices 1006 from the wireless device 1008 for a fine position estimate. The network node 1002 may select a subset of the set of proximity devices 1006 based on the calculated position estimate at 1014. In some aspects, the network node 1002 may store last known locations of devices in a vicinity around the wireless device 1008. For example, the network node 1002 may compute locations of wireless devices based on RSSI measurements received from the set of proximity devices 1004 and/or the set of proximity devices 1006. As such the network node 1002 may be aware of a perceived density of devices capable of interfering with wireless signals about the wireless device 1008, and may schedule the beacons based on the perceived density. The network node 1002 may select the subset of the set of proximity devices 1006 based on a geometry of the coarse position of the wireless device 1008 calculated at 1014. The network node 1002 may select a subset of the set of proximity devices 1006 that surround the coarse position calculated at 1014, for good dilution of precision. Since some of the set of proximity devices 1006 may have limited power resources (e.g., smaller battery for an ESL), some of the subset of the set of proximity devices 1006 may run out of power resources faster than others of the subset of the set of proximity devices 1006. Accordingly, the network node 1002 may track the power consumption of the set of proximity devices 1006 to uniformly distribute, or uniformly conserve power among the subset of the set of proximity devices 1006 to maximize the number of the set of proximity devices 1006 may be selected for listening to the set of beacon signals 1026.

The network node 1002 may transmit a set of beacon schedules 1020 to the subset of the set of proximity devices 1006. The set of beacon schedules 1020 may indicate to the subset of the set of proximity devices 1006 when the wireless device 1008 is expected to transmit the set of beacon signals 1026. The network node 1002 may transmit a set of beacon schedules 1021 to the set of proximity devices 1004. The set of beacon schedules 1021 may indicate to the set of proximity devices 1004 when and how to transmit the set of energizing signals 1022 to the wireless device 1008. In some aspects, the network node 1002 may configure, via the set of beacon schedules 1021, the set of energizing signals 1022 from at least some of the set of proximity devices 1004 to control the operation of the wireless device 1008, for example by inserting, removing, or configuring a tone signature within at least one of the set of energizing signals 1022. A tone signature may be a set of tones of an energizing signal that indicate to a wireless device an attribute to use for transmitting a set of beacon signals. For example, a tone signature may indicate to the wireless device 1008 to use one or more channels for transmitting the set of beacon signals 1026. In another example, a tone signature may indicate to the wireless device 1008 to select a random channel from a set of channels for transmitting the set of beacon signals 1026. In another example, a tone signature may indicate to the wireless device 1008 to use one or more timing offsets for transmitting the set of beacon signals 1026. In another example, a tone signature may indicate to the wireless device 1008 to randomly select from a set of timing offsets (i.e., a random backoff factor) for transmitting the set of beacon signals 1026. In some aspects, the set of timing offsets may be indicated in terms of timing slots (e.g., 1.25 milliseconds each) or may be of finer granularity (e.g., smaller offsets within a slot). In some aspects, the network node 1002 may configure at least a subset of the set of proximity devices 1004 to monitor for the set of beacon signals 1026 by monitoring the full set of channels or the full set of timing offsets that the wireless device 1008 selects from. The network node 1002 may transmit such a configuration as the set of beacon schedules 1020.

The wireless device 1008 may transmit the set of beacon signals 1026. The wireless device 1008 may transmit the set of beacon signals 1026 based on receiving the set of energizing signals 1022. The wireless device 1008 may transmit the set of beacon signals 1026 based on a tone signature in one or more of the set of energizing signals 1022. The subset of the set of proximity devices 1006 may receive a set of beacon signals 1026 from the wireless device 1008.

In some aspects, the network node 1002 may schedule the set of beacon signals 1026 from the wireless device 1008 to have two different types of packets (e.g., HADM packets and UL packets) to assist in positioning fusion at the network node 1002. In some aspects, the network node 1002 may couple the transmissions tightly in the time-domain, such as a periodic set of transmissions including an UL packet transmission from the wireless device 1008 followed by three HADM packets transmitted from the wireless device 1008. In other words, the wireless device 1008 may interleave the HADM transmissions between UL-RSSI transmissions. The wireless device 1008 may interleave the transmissions in accordance with a transmission schedule indicated by at least one of the set of energizing signals 1022. Gaps between UL-RSSI transmissions may be used for scheduling CS event(s). In some aspects, the HADM packets may include 79 bidirectional exchanges over a MHz channels, while the DL-RSSI packets may be unidirectional transmissions over 2 MHz channels. A non-overlapping pattern of 79 channels may be overlapped in time.

At 1028, the set of proximity devices 1004 may measure the set of beacon signals 1026. The set of proximity devices 1004 may transmit the set of beacon measurements 1030 to the network node 1002. At 1029, the set of proximity devices 1006 may measure the set of beacon signals 1026. The set of proximity devices 1006 may transmit the set of beacon measurements 1031 to the network node 1002. In some aspects, the set of beacon measurements 1030 may include a set of locations calculated based on the beacon measurements measured at 1028. In some aspects, the set of beacon measurements 1031 may include a set of locations calculated based on the beacon measurements measured at 1029. At 1032, the network node 1002 may calculate a position estimate of the wireless device 1008 based on the measurements taken at 1028 and at 1029, and the known locations of the set of proximity devices 1004 and the set of proximity devices 1006. This may be a fine estimate of the wireless device 1008. In some aspects, the set of beacon measurements 1030 may be of a different type than the set of beacon measurements 1031. For example, the set of beacon measurements 1030 may include HADM/BCS measurements and the set of beacon measurements 1031 may include UL-RSSI measurements. The network node 1002 may be configured to fuse different types of measurements to calculate a location of the wireless device 1008. Fusion between UL-RSSI and HADM measurements may include the use of both UL-RSSI and HADM measurements to calculate a fine location estimate of the wireless device 1008. Any suitable mathematical formulations or optimizations may be utilized, for example coarse estimates via HADM and fine estimates via UL-RSSI, or vice-versa. The location calculation based on the UL-RSSI measurements may be used to corroborate the location calculation based on HADM. In some aspects, the network node 1002 may configure additional RTT measurements if the UL-RSSI calculation and the HADM calculation are not corroborated (e.g., for security purposes), and may not configure additional RTT measurements if the UL-RSSI calculation and the HADM calculation are corroborated. This may reduce overhead and energy consumption by the wireless device 1008.

In some aspects, the network node 1002 may calculate a detection zone associated with the selected subset of the set of proximity devices 1006. If the wireless device 1008 travels outside of the detection zone, the network node 1002 may be configured to select a new subset of the set of proximity devices 1006. The network node 1002 may be configured to periodically track the location of the wireless device 1008, for example by calculating the location of the wireless device 1008 based on the set of beacon measurements 1013, the set of beacon measurements 1030, and/or the set of beacon measurements 1031. In response to the network node 1002 calculating that the wireless device 1008 has traveled outside of the detection zone, or is traveling towards a boundary of the detection zone, at 1018, the network node 1002 may re-select the subset of the set of proximity devices 1006 based on the detected movement of the wireless device 1008.

In some aspects, the network node 1002 may calculate a velocity of the wireless device 1008, for example via the calculated position estimate at 1032 or the calculated position estimate at 1014. In some aspects, the network node 1002 may reselect the subset of the set of proximity devices 1006 to preemptively schedule, awaken, or otherwise ready the reselected subset of the set of proximity devices 1006, effectively moving the bubble of ready devices towards the calculated direction of the wireless device 1008. In some aspects, the coarse estimate calculated at 1014 may be off by a factor. The network node 1002 may calculate the bubble to be large enough to accommodate the error factor. In other words, the network node 1002 may select the subset of the set of proximity devices 1006 based at least on the coarse estimate calculated at 1014 and the calculated error factor.

FIG. 11 is a flowchart 1100 of a method of wireless communication. The method may be performed by a wireless device (e.g., the UE 104, the UE 350; the wireless device 404, the wireless device 602, the wireless device 604, the wireless device 908, the wireless device 1008; the target device 742, the target device 744, the target device 848, the target device 850; the apparatus 1804). At 1102, the wireless device may receive a first set of beacon messages from a first set of proximity devices. For example, 1102 may be performed by the wireless device 908 in FIG. 9, which may receive the set of beacon signals 910 from the set of proximity devices 904. Moreover, 1102 may be performed by the component 198 in FIG. 1, 3, or 18.

At 1104, the wireless device may measure the first set of beacon messages. For example, 1104 may be performed by the wireless device 908 in FIG. 9, which may, at 912, measure the set of beacon signals 910. Moreover, 1104 may be performed by the component 198 in FIG. 1, 3, or 18.

At 1106, the wireless device may calculate a first position estimate of the wireless device based on the measured first set of beacon messages and a first set of locations associated with the first set of proximity devices. For example, 1106 may be performed by the wireless device 908 in FIG. 9, which may, at 914, calculate a first position estimate of the wireless device 908 based on the measurements at 912 and a set of locations associated with the set of proximity devices 904. Moreover, 1106 may be performed by the component 198 in FIG. 1, 3, or 18.

At 1108, the wireless device may transmit the first position estimate. For example, 1108 may be performed by the wireless device 908 in FIG. 9, which may transmit the position estimate 916 to the network node 902. Moreover, 1108 may be performed by the component 198 in FIG. 1, 3, or 18.

At 1110, the wireless device may receive a second set of beacon messages from a subset of a second set of proximity devices based on the first position estimate. For example, 1110 may be performed by the wireless device 908 in FIG. 9, which may receive the set of beacon signals 926 from a subset of the set of proximity devices 906 based on the position estimate 916. Moreover, 1110 may be performed by the component 198 in FIG. 1, 3, or 18.

At 1112, the wireless device may measure the second set of beacon messages. For example, 1112 may be performed by the wireless device 908 in FIG. 9, which may, at 928, measure the set of beacon signals 926. Moreover, 1112 may be performed by the component 198 in FIG. 1, 3, or 18.

At 1114, the wireless device may calculate a second position estimate of the wireless device based on the measured second set of beacon messages and a second set of locations associated with the subset of the second set of proximity devices. For example, 1114 may be performed by the wireless device 908 in FIG. 9, which may, at 932, calculate a second position estimate of the wireless device 908 based on the measurements at 928 and a second set of locations associated with the subset of the set of proximity devices 906. Moreover, 1114 may be performed by the component 198 in FIG. 1, 3, or 18.

FIG. 12 is a flowchart 1200 of a method of wireless communication. The method may be performed by a wireless device (e.g., the UE 104, the UE 350; the wireless device 404, the wireless device 602, the wireless device 604, the wireless device 908, the wireless device 1008; the target device 742, the target device 744, the target device 848, the target device 850; the apparatus 1804). At 1202, the wireless device may receive a first set of beacon messages from a first set of proximity devices. For example, 1202 may be performed by the wireless device 908 in FIG. 9, which may receive the set of beacon signals 910 from the set of proximity devices 904. Moreover, 1202 may be performed by the component 198 in FIG. 1, 3, or 18.

At 1204, the wireless device may measure the first set of beacon messages. For example, 1204 may be performed by the wireless device 908 in FIG. 9, which may, at 912, measure the set of beacon signals 910. Moreover, 1204 may be performed by the component 198 in FIG. 1, 3, or 18.

At 1206, the wireless device may calculate a first position estimate of the wireless device based on the measured first set of beacon messages and a first set of locations associated with the first set of proximity devices. For example, 1206 may be performed by the wireless device 908 in FIG. 9, which may, at 914, calculate a first position estimate of the wireless device 908 based on the measurements at 912 and a set of locations associated with the set of proximity devices 904. Moreover, 1206 may be performed by the component 198 in FIG. 1, 3, or 18.

At 1208, the wireless device may transmit the first position estimate. For example, 1208 may be performed by the wireless device 908 in FIG. 9, which may transmit the position estimate 916 to the network node 902. Moreover, 1208 may be performed by the component 198 in FIG. 1, 3, or 18.

At 1210, the wireless device may receive a second set of beacon messages from a subset of a second set of proximity devices based on the first position estimate. For example, 1210 may be performed by the wireless device 908 in FIG. 9, which may receive the set of beacon signals 926 from a subset of the set of proximity devices 906 based on the position estimate 916. Moreover, 1210 may be performed by the component 198 in FIG. 1, 3, or 18.

At 1212, the wireless device may measure the second set of beacon messages. For example, 1212 may be performed by the wireless device 908 in FIG. 9, which may, at 928, measure the set of beacon signals 926. Moreover, 1212 may be performed by the component 198 in FIG. 1, 3, or 18.

At 1214, the wireless device may calculate a second position estimate of the wireless device based on the measured second set of beacon messages and a second set of locations associated with the subset of the second set of proximity devices. For example, 1214 may be performed by the wireless device 908 in FIG. 9, which may, at 932, calculate a second position estimate of the wireless device 908 based on the measurements at 928 and a second set of locations associated with the subset of the set of proximity devices 906. Moreover, 1214 may be performed by the component 198 in FIG. 1, 3, or 18.

At 1216, the wireless device may receive an indicator of a detection zone associated with the subset of the second set of proximity devices. For example, 1216 may be performed by the wireless device 908 in FIG. 9, which may receive the detection zone 924 from the network node 902. The detection zone 924 may be an indicator of a detection zone associated with the subset of the set of proximity devices 906. For example, the detection zone 924 may indicate when the accuracy of the location of the wireless device 908 calculated at 932 is reduced in accuracy or has a larger margin of error. Moreover, 1216 may be performed by the component 198 in FIG. 1, 3, or 18.

At 1218, the wireless device may receive a third set of beacon messages from the first set of proximity devices. For example, 1218 may be performed by the wireless device 908 in FIG. 9, which may receive the set of beacon signals 910 from the set of proximity devices 904. The set of beacon signals 910 may be transmitted from the set of proximity devices 904 periodically, or cyclically. Moreover, 1218 may be performed by the component 198 in FIG. 1, 3, or 18.

At 1220, the wireless device may measure the third set of beacon messages. For example, 1220 may be performed by the wireless device 908 in FIG. 9, which may, at 912, measure the set of beacon signals 910. Moreover, 1220 may be performed by the component 198 in FIG. 1, 3, or 18.

At 1222, the wireless device may calculate a third position estimate of the wireless device based on the measured third set of beacon messages and the first set of locations associated with the first set of proximity devices. For example, 1222 may be performed by the wireless device 908 in FIG. 9, which may, at 914, calculate a third position estimate of the wireless device 908 based on the measurements at 912 and the first set of locations associated with the set of proximity devices 904. Moreover, 1222 may be performed by the component 198 in FIG. 1, 3, or 18.

At 1224, the wireless device may transmit the third position estimate in response to the third position estimate being outside the detection zone. For example, 1224 may be performed by the wireless device 908 in FIG. 9, which may transmit the position estimate 916 to the network node 902 in response to the position estimate 916 being outside the detection zone 924. Moreover, 1224 may be performed by the component 198 in FIG. 1, 3, or 18.

At 1226, the wireless device may receive a fourth set of beacon messages from a second subset of the second set of proximity devices based on the third position estimate. For example, 1226 may be performed by the wireless device 908 in FIG. 9, which may receive the set of beacon signals 926 from a second subset of the set of proximity devices 906 based on the position estimate 916. Moreover, 1226 may be performed by the component 198 in FIG. 1, 3, or 18.

At 1228, the wireless device may measure the fourth set of beacon messages. For example, 1228 may be performed by the wireless device 908 in FIG. 9, which may, at 928, measure the set of beacon signals 926. Moreover, 1228 may be performed by the component 198 in FIG. 1, 3, or 18.

At 1230, the wireless device may calculate a fourth position estimate of the wireless device based on the measured fourth set of beacon messages and a third set of locations associated with the second subset of the second set of proximity devices. For example, 1230 may be performed by the wireless device 908 in FIG. 9, which may, at 930, calculate a fourth position estimate of the wireless device 908 based on the measurements at 928 and a third set of locations associated with the second subset of the set of proximity devices 906. Moreover, 1230 may be performed by the component 198 in FIG. 1, 3, or 18.

Figure 13:
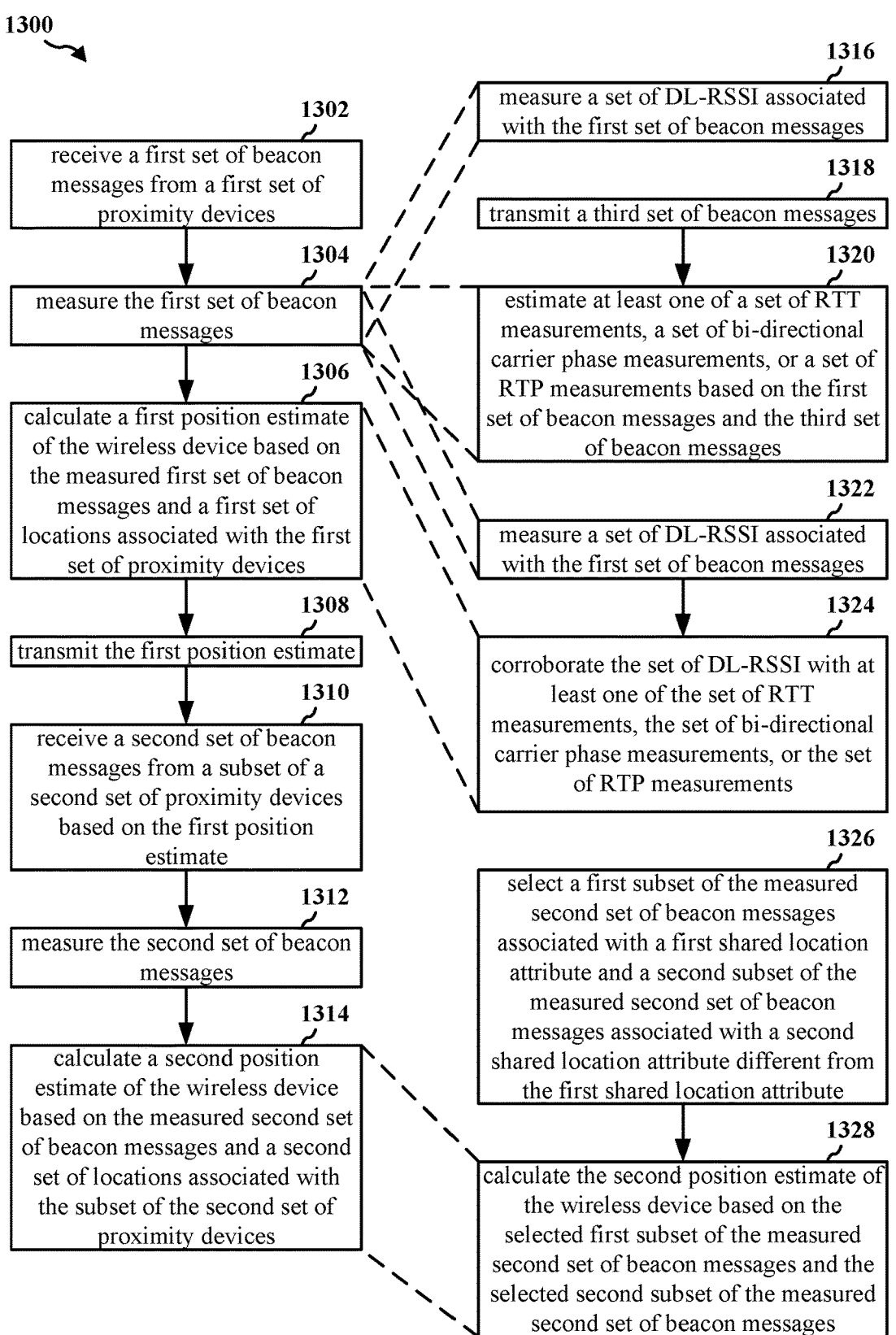
FIG. 13 is a flowchart of a method of wireless communication.

FIG. 13 is a flowchart 1300 of a method of wireless communication. The method may be performed by a wireless device (e.g., the UE 104, the UE 350; the wireless device 404, the wireless device 602, the wireless device 604, the wireless device 908, the wireless device 1008; the target device 742, the target device 744, the target device 848, the target device 850; the apparatus 1804). At 1302, the wireless device may receive a first set of beacon messages from a first set of proximity devices. For example, 1302 may be performed by the wireless device 908 in FIG. 9, which may receive the set of beacon signals 910 from the set of proximity devices 904. Moreover, 1302 may be performed by the component 198 in FIG. 1, 3, or 18.

At 1304, the wireless device may measure the first set of beacon messages. For example, 1304 may be performed by the wireless device 908 in FIG. 9, which may, at 912, measure the set of beacon signals 910. Moreover, 1304 may be performed by the component 198 in FIG. 1, 3, or 18.

At 1306, the wireless device may calculate a first position estimate of the wireless device based on the measured first set of beacon messages and a first set of locations associated with the first set of proximity devices. For example, 1306 may be performed by the wireless device 908 in FIG. 9, which may, at 914, calculate a first position estimate of the wireless device 908 based on the measurements at 912 and a set of locations associated with the set of proximity devices 904. Moreover, 1306 may be performed by the component 198 in FIG. 1, 3, or 18.

At 1308, the wireless device may transmit the first position estimate. For example, 1308 may be performed by the wireless device 908 in FIG. 9, which may transmit the position estimate 916 to the network node 902. Moreover, 1308 may be performed by the component 198 in FIG. 1, 3, or 18.

At 1310, the wireless device may receive a second set of beacon messages from a subset of a second set of proximity devices based on the first position estimate. For example, 1310 may be performed by the wireless device 908 in FIG. 9, which may receive the set of beacon signals 926 from a subset of the set of proximity devices 906 based on the position estimate 916. Moreover, 1310 may be performed by the component 198 in FIG. 1, 3, or 18.

At 1312, the wireless device may measure the second set of beacon messages. For example, 1312 may be performed by the wireless device 908 in FIG. 9, which may, at 928, measure the set of beacon signals 926. Moreover, 1312 may be performed by the component 198 in FIG. 1, 3, or 18.

At 1314, the wireless device may calculate a second position estimate of the wireless device based on the measured second set of beacon messages and a second set of locations associated with the subset of the second set of proximity devices. For example, 1314 may be performed by the wireless device 908 in FIG. 9, which may, at 932, calculate a second position estimate of the wireless device 908 based on the measurements at 928 and a second set of locations associated with the subset of the set of proximity devices 906. Moreover, 1314 may be performed by the component 198 in FIG. 1, 3, or 18.

At 1316, the wireless device may measure the first set of beacon messages by measuring a set of DL-RSSI associated with the first set of beacon messages. For example, 1316 may be performed by the wireless device 908 in FIG. 9, which may, at 912, measure a set of DL-RSSI of the set of beacon signals 910. Moreover, 1316 may be performed by the component 198 in FIG. 1, 3, or 18.

At 1318, the wireless device may transmit a third set of beacon messages. For example, 1318 may be performed by the wireless device 908 in FIG. 9, which may transmit the set of beacon signals 909 to the set of proximity devices 904. Moreover, 1318 may be performed by the component 198 in FIG. 1, 3, or 18.

At 1320, the wireless device may measure the first set of beacon messages by estimating at least one of a set of RTT measurements, a set of bi-directional carrier phase measurements, or a set of RTP measurements based on the first set of beacon messages and the third set of beacon messages. For example, 1320 may be performed by the wireless device 908 in FIG. 9, which may, at 914, estimate at least one of a set of RTT measurements, a set of bi-directional carrier phase measurements, or a set of RTP measurements based on the set of beacon signals 910 and the set of beacon signals 909. The measurements may be of bidirectional HADM packets that are interleaved between unidirectional DL packet transmissions. Moreover, 1320 may be performed by the component 198 in FIG. 1, 3, or 18.

At 1322, the wireless device may measure the first set of beacon messages by measuring a set of DL-RSSI associated with the second set of beacon messages. For example, 1322 may be performed by the wireless device 908 in FIG. 9, which may, at 912, measure a set of DL-RSSI for the set of beacon signals 910. The measurements may be of unidirectional DL packet transmissions that are interleaved between bidirectional HADM packets. Moreover, 1322 may be performed by the component 198 in FIG. 1, 3, or 18.

At 1324, the wireless device may calculate the first position estimate of the wireless device based on the measured first set of beacon messages and the first set of locations associated with the first set of proximity devices by corroborating the set of DL-RSSI with at least one of the set of RTT measurements, the set of bi-directional carrier phase measurements, or the set of RTP measurements. For example, 1324 may be performed by the wireless device 908 in FIG. 9, which may, at 932, corroborate the set of DL-RSSI with at least one of the set of RTT measurements, the set of bi-directional carrier phase measurements, or the set of RTP measurements measured at 912. In other words, the wireless device 908 may corroborate a location calculated via RSSI measurements with a location calculated via HADM. In response to the wireless device 908 corroborating the locations, the wireless device 908 may not schedule additional RTT measurements. In response to the wireless device 908 failing to corroborate the locations, the wireless device 908 may schedule additional RTT measurements. Moreover, 1324 may be performed by the component 198 in FIG. 1, 3, or 18.

At 1326, the wireless device may select a first subset of the measured second set of beacon messages associated with a first shared location attribute and a second subset of the measured second set of beacon messages associated with a second shared location attribute different from the first shared location attribute. For example, 1326 may be performed by the wireless device 908 in FIG. 9, which may, at 932, select a first subset of the measurements collected at 928 that are associated with a first shared location attribute (e.g., a row, a shelf) and a second subset of the measurements collected at 928 associated with a second shared location attribute different from the first shared location attribute (e.g., a different row or a different shelf). Moreover, 1326 may be performed by the component 198 in FIG. 1, 3, or 18.

At 1328, the wireless device may calculate a second position estimate of the wireless device based on the measured second set of beacon messages and a second set of locations associated with the subset of the second set of proximity devices by calculating the second position estimate of the wireless device based on the selected first subset of the measured second set of beacon messages and the selected second subset of the measured second set of beacon messages. For example, 1328 may be performed by the wireless device 908 in FIG. 9, which may, at 932, calculate the second position estimate of the wireless device 908 based on the selected first subset of the measurements collected at 928 and the selected second subset of the measurements collected at 928. Moreover, 1328 may be performed by the component 198 in FIG. 1, 3, or 18.

FIG. 14A is a flowchart 1400 of a method of wireless communication. The method may be performed by a network node (e.g., the base station 102, the base station 310; the wireless device 402, the wireless device 406, the wireless device 602, the wireless device 604; the server 702, the server 802; the AP 704, the AP 705, the AP 804; the network node 902; the network node 1002; the network entity 1802, the network entity 1902, the network entity 2060). At 1402, the network node may receive a first position estimate. For example, 1402 may be performed by the network node 902 in FIG. 9, which may receive the position estimate 916. Moreover, 1402 may be performed by the component 199 in FIG. 1, 3, 19, or 20.

At 1404, the network node may transmit a first set of beacon transmission schedules that schedule a first set of beacon messages from a subset of a first set of proximity devices based on the first position estimate of a wireless device. For example, 1404 may be performed by the network node 902 in FIG. 9, which may transmit the set of beacon schedules 920 to a subset of the set of proximity devices 906 based on the position estimate 916 corresponding with the wireless device 908. Moreover, 1404 may be performed by the component 199 in FIG. 1, 3, 19, or 20.

FIG. 14B is a flowchart 1450 of a method of wireless communication. The method may be performed by a network node (e.g., the base station 102, the base station 310; the wireless device 402, the wireless device 406, the wireless device 602, the wireless device 604; the server 702, the server 802; the AP 704, the AP 705, the AP 804; the network node 902; the network node 1002; the network entity 1802, the network entity 1902, the network entity 2060). At 1452, the network node may receive a first set of beacon measurements from a subset of a first set of proximity devices. The first set of beacon measurements may be associated with a wireless device. For example, 1452 may be performed by the network node 1002 in FIG. 10, which may receive the set of beacon measurements 1031 from a subset of the set of proximity devices 1006. The set of beacon measurements 1031 may be associated with the wireless device 1008. Moreover, 1452 may be performed by the component 199 in FIG. 1, 3, 19, or 20.

At 1454, the network node may calculate a second position estimate of the wireless device based on the first set of beacon measurements and a first set of locations associated with the subset of the first set of proximity devices. For example, 1454 may be performed by the network node 1002 in FIG. 10, which may, at 1032, calculate a second position estimate of the wireless device 1008 based on the set of beacon measurements 1031 and a first set of locations associated with the subset of the set of proximity devices 1006. Moreover, 1454 may be performed by the component 199 in FIG. 1, 3, 19, or 20.

FIG. 15 is a flowchart 1500 of a method of wireless communication. The method may be performed by a network node (e.g., the base station 102, the base station 310; the wireless device 402, the wireless device 406, the wireless device 602, the wireless device 604; the server 702, the server 802; the AP 704, the AP 705, the AP 804; the network node 902; the network node 1002; the network entity 1802, the network entity 1902, the network entity 2060). At 1502, the network node may receive a first position estimate. For example, 1502 may be performed by the network node 902 in FIG. 9, which may receive the position estimate 916. Moreover, 1502 may be performed by the component 199 in FIG. 1, 3, 19, or 20.

At 1504, the network node may configure the first set of beacon transmission schedules based on a second set of beacon transmission schedules that schedule a second set of beacon messages from a second set of proximity devices. For example, 1504 may be performed by the network node 902 in FIG. 9, which may, at 918, configure the set of beacon schedules 920 based on a second set of beacon transmission schedules that schedule the set of beacon signals 910 from the set of proximity devices 904. In another example, the network node 902 may, at 918, configure the set of beacon schedules 920 based on a second set of beacon transmission schedules that schedule some of the set of beacon signals 926 from the subset of the set of proximity devices 906. The first set of beacon transmission schedules may schedule a set of BLE signals, and the second set of beacon transmission schedules may schedule a set of DL packet transmissions. Moreover, 1504 may be performed by the component 199 in FIG. 1, 3, 19, or 20.

At 1506, the network node may transmit a first set of beacon transmission schedules that schedule a first set of beacon messages from a subset of a first set of proximity devices based on the first position estimate of a wireless device. For example, 1506 may be performed by the network node 902 in FIG. 9, which may transmit the set of beacon schedules 920 to a subset of the set of proximity devices 906 based on the position estimate 916 corresponding with the wireless device 908. Moreover, 1506 may be performed by the component 199 in FIG. 1, 3, 19, or 20.

At 1508, the network node may configure the second set of beacon transmission schedules. For example, 1508 may be performed by the network node 902 in FIG. 9, which may configure the second set of beacon transmission schedules for the set of proximity devices 904. In another example, the network node 902 may configure the second set of beacon transmission schedules for the subset of the set of proximity devices 906. Moreover, 1508 may be performed by the component 199 in FIG. 1, 3, 19, or 20.

At 1510, the network node may transmit the second set of beacon transmission schedules. For example, 1510 may be performed by the network node 902 in FIG. 9, which may transmit the second set of beacon transmission schedules to the set of proximity devices 904. In another example, the network node 902 may transmit the second set of beacon transmission schedules to the subset of the set of proximity devices 906. Moreover, 1510 may be performed by the component 199 in FIG. 1, 3, 19, or 20.

At 1512, the network node may configure the second set of beacon transmission schedules by scheduling at least one of the first set of beacon messages in between at least two of the second set of beacon messages. For example, 1512 may be performed by the network node 902 in FIG. 9, which may schedule at least one of the set of beacon signals 926 in between at least two of the set of beacon signals 910. In another example, the network node 902 may schedule at least one of the set of beacon signals 926 in between at least two other types of the set of beacon signals 926 (e.g., a BLE signal between two DL signals, a DL signal in between two BLE signals). Moreover, 1512 may be performed by the component 199 in FIG. 1, 3, 19, or 20.

FIG. 16 is a flowchart 1600 of a method of wireless communication. The method may be performed by a network node (e.g., the base station 102, the base station 310; the wireless device 402, the wireless device 406, the wireless device 602, the wireless device 604; the server 702, the server 802; the AP 704, the AP 705, the AP 804; the network node 902; the network node 1002; the network entity 1802, the network entity 1902, the network entity 2060).

At 1602, the network node may receive a second set of beacon measurements from a second set of proximity devices. For example, 1602 may be performed by the network node 1002 in FIG. 10, which may receive the set of beacon measurements 1013 from the set of proximity devices 1004. Moreover, 1602 may be performed by the component 199 in FIG. 1, 3, 19, or 20.

At 1604, the network node may calculate a third position estimate of the wireless device based on the second set of beacon measurements. For example, 1604 may be performed by the network node 1002 in FIG. 10, which may, at 1014, calculate a third position estimate of the wireless device 908 based on the set of beacon measurements 1013. Moreover, 1604 may be performed by the component 199 in FIG. 1, 3, 19, or 20.

At 1606, the network node may select a subset of a first set of proximity devices based on the calculated third position estimate. For example, 1606 may be performed by the network node 1002 in FIG. 10, which may, at 1018, select a subset of the set of proximity devices 1006 based on the calculation at 1014. Moreover, 1606 may be performed by the component 199 in FIG. 1, 3, 19, or 20.

At 1608, the network node may transmit, to the subset of the first set of proximity devices, a first set of beacon reception schedules that schedule receipt of a second set of beacons from the wireless device for a measurement of the first set of beacon measurements. For example, 1608 may be performed by the network node 1002 in FIG. 10, which may transmit, to the subset of the set of proximity devices 1006, a set of beacon schedules 1020 that schedule receipt of the set of beacon signals 1026 from the wireless device 1008 for the measurement at 1029. Moreover, 1608 may be performed by the component 199 in FIG. 1, 3, 19, or 20.

At 1610, the network node may transmit, to the subset of the first set of proximity devices, a wake-up signal to receive the second set of beacons from the wireless device. For example, 1610 may be performed by the network node 1002 in FIG. 10, which may transmit, to the subset of the set of proximity devices 1006, a wake-up signal to receive the set of beacon signals 1026 from the wireless device 908. Moreover, 1610 may be performed by the component 199 in FIG. 1, 3, 19, or 20.

At 1612, the network node may receive a first set of beacon measurements from a subset of a first set of proximity devices. The first set of beacon measurements may be associated with a wireless device. For example, 1612 may be performed by the network node 1002 in FIG. 10, which may receive the set of beacon measurements 1031 from a subset of the set of proximity devices 1006. The set of beacon measurements 1031 may be associated with the wireless device 1008. Moreover, 1612 may be performed by the component 199 in FIG. 1, 3, 19, or 20.

At 1614, the network node may calculate a second position estimate of the wireless device based on the first set of beacon measurements and a first set of locations associated with the subset of the first set of proximity devices. For example, 1614 may be performed by the network node 1002 in FIG. 10, which may, at 1032, calculate a second position estimate of the wireless device 1008 based on the set of beacon measurements 1031 and a first set of locations associated with the subset of the set of proximity devices 1006. Moreover, 1614 may be performed by the component 199 in FIG. 1, 3, 19, or 20.

At 1616, the network node may transmit, to the second set of proximity devices, a first set of energizing schedules that schedule transmission of a first set of energizing signals. The first set of energizing signals may include a tone signature. For example, 1616 may be performed by the network node 1002 in FIG. 10, which may transmit, to the set of proximity devices 1004, a first set of energizing schedules that schedule transmission of the set of energizing signals 1009. The set of energizing signals 1009 may include a tone signature. In another example, the network node 1002 may transmit, to the set of proximity devices 1004, the set of beacon schedules 1021 that schedule transmission of the set of energizing signals 1022. The set of energizing signals 1022 may include a tone signature. Moreover, 1616 may be performed by the component 199 in FIG. 1, 3, 19, or 20.

At 1618, the network node may select a second subset of the second set of beacon measurements associated with a first shared location attribute and a third subset of the second set of beacon measurements associated with a second shared location attribute different from the first shared location attribute. For example, 1618 may be performed by the network node 1002 in FIG. 10, which may, at 1032, select a second subset of the set of beacon measurements 1013 associated with a first shared location attribute and a third subset of the set of beacon measurements 1013 associated with a second shared location attribute different from the first shared location attribute (e.g., different rows, different shelves, different columns). Moreover, 1618 may be performed by the component 199 in FIG. 1, 3, 19, or 20.

At 1620, the network node may calculate the third position estimate of the wireless device based on the selected second subset of the second set of beacon measurements and the selected third subset of the second set of beacon measurements. For example, 1620 may be performed by the network node 1002 in FIG. 10, which may, at 1014/calculate the third position estimate of the wireless device 1008 based on the selected second subset of the second set of beacon measurements and the selected third subset of the second set of beacon measurements at 1618. Moreover, 1620 may be performed by the component 199 in FIG. 1, 3, 19, or 20.

At 1622, the network node may receive a set of density reports from the second set of proximity devices. For example, 1622 may be performed by the network node 1002 in FIG. 10, which may receive a set of density reports from the second set of proximity devices as the set of beacon measurements 1013. In other words, the set of proximity devices 1004 may transmit beacon measurements and density reports to the network node 1002. Moreover, 1622 may be performed by the component 199 in FIG. 1, 3, 19, or 20.

At 1624, the network node may calculate a density metric based on the set of density reports. For example, 1624 may be performed by the network node 1002 in FIG. 10, which may calculate a density metric based on the set of density reports. Moreover, 1624 may be performed by the component 199 in FIG. 1, 3, 19, or 20.

At 1626, the network node may select the subset of the first set of proximity devices further based on the density metric. For example, 1626 may be performed by the network node 1002 in FIG. 10, which may, at 1018, select the subset of the set of proximity devices 1006 further based on the density metric. Moreover, 1626 may be performed by the component 199 in FIG. 1, 3, 19, or 20.

FIG. 17 is a flowchart 1700 of a method of wireless communication. The method may be performed by a network node (e.g., the base station 102, the base station 310; the wireless device 402, the wireless device 406, the wireless device 602, the wireless device 604; the server 702, the server 802; the AP 704, the AP 705, the AP 804; the network node 902; the network node 1002; the network entity 1802, the network entity 1902, the network entity 2060).

At 1702, the network node may receive a first position estimate. For example, 1702 may be performed by the network node 902 in FIG. 9, which may receive the position estimate 916. Moreover, 1702 may be performed by the component 199 in FIG. 1, 3, 19, or 20.

At 1704, the network node may transmit a first set of beacon transmission schedules that schedule a first set of beacon messages from a subset of a first set of proximity devices based on the first position estimate of a wireless device. For example, 1704 may be performed by the network node 902 in FIG. 9, which may transmit the set of beacon schedules 920 to a subset of the set of proximity devices 906 based on the position estimate 916 corresponding with the wireless device 908. Moreover, 1704 may be performed by the component 199 in FIG. 1, 3, 19, or 20.

At 1706, the network node may select the subset of the first set of proximity devices based on the first position estimate of a wireless device. For example, 1706 may be performed by the network node 902 in FIG. 9, which may, at 918, select the subset of the set of proximity devices 1006 based on the position estimate 916. Moreover, 1706 may be performed by the component 199 in FIG. 1, 3, 19, or 20.

At 1708, the network node may calculate a detection zone based on the selected subset of the first set of proximity devices. For example, 1708 may be performed by the network node 902 in FIG. 9, which may, at 918, calculate a detection zone based on the selected subset of the set of proximity devices 1006. Moreover, 1708 may be performed by the component 199 in FIG. 1, 3, 19, or 20.

At 1710, the network node may transmit an indicator of the detection zone. For example, 1710 may be performed by the network node 902 in FIG. 9, which may transmit the detection zone 924 to the wireless device 908. Moreover, 1710 may be performed by the component 199 in FIG. 1, 3, 19, or 20.

At 1712, the network node may receive a third position estimate of the wireless device. The third position estimate may be outside the detection zone. For example, 1712 may be performed by the network node 902 in FIG. 9, which may receive the position estimate 916 of the wireless device 908. The third position estimate may be outside the detection zone 924. Moreover, 1712 may be performed by the component 199 in FIG. 1, 3, 19, or 20.

At 1714, the network node may select a second subset of the first set of proximity devices based on the third position estimate of the wireless device. For example, 1714 may be performed by the network node 902 in FIG. 9, which may, at 918, select a second subset of the set of proximity devices 906 based on the position estimate 916. Moreover, 1714 may be performed by the component 199 in FIG. 1, 3, 19, or 20.

At 1716, the network node may calculate a second detection zone based on the selected second subset of the first set of proximity devices. For example, 1716 may be performed by the network node 902 in FIG. 9, which may, at 918, calculate a second detection zone based on the selected second subset of the set of proximity devices 906. Moreover, 1716 may be performed by the component 199 in FIG. 1, 3, 19, or 20.

At 1718, the network node may transmit a second indicator of the second detection zone. For example, 1718 may be performed by the network node 902 in FIG. 9, which may transmit the detection zone 924 after being updated at 918. Moreover, 1718 may be performed by the component 199 in FIG. 1, 3, 19, or 20.

At 1720, the network node may transmit a second set of beacon transmission schedules that schedule a second set of beacon messages from the second subset of the first set of proximity devices based on the second position estimate of the wireless device. For example, 1720 may be performed by the network node 902 in FIG. 9, which may transmit the set of beacon schedules 922 that schedule the set of beacon signals 926 from the second subset of the set of proximity devices 906 based on the position estimate 916. Moreover, 1720 may be performed by the component 199 in FIG. 1, 3, 19, or 20.

Figure 18:
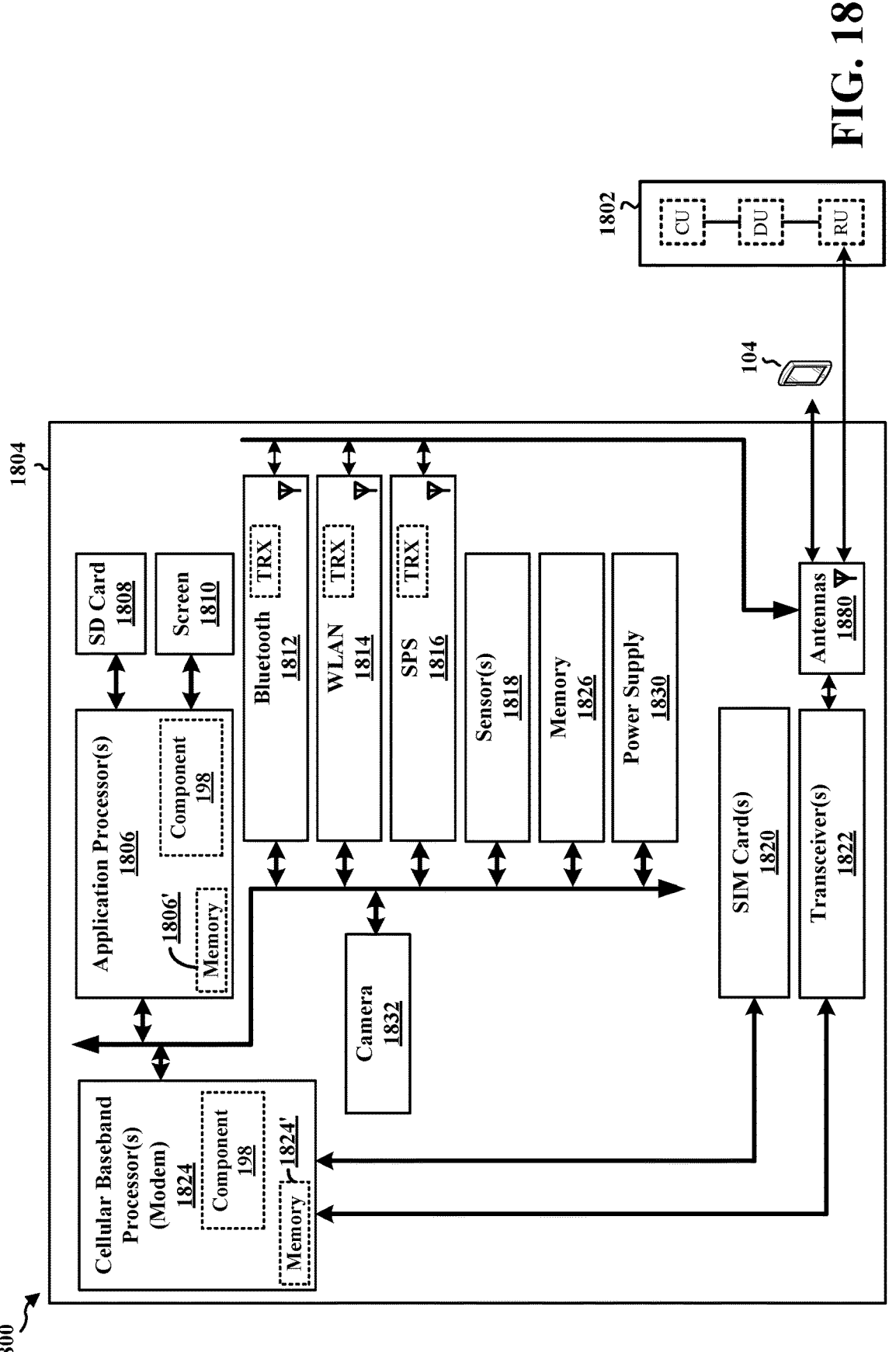
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include at least one cellular baseband processor 1824 (also referred to as a modem) coupled to one or more transceivers 1822 (e.g., cellular RF transceiver). The cellular baseband processor(s) 1824 may include at least one on-chip memory 1824'. In some aspects, the apparatus 1804 may further include one or more subscriber identity modules (SIM) cards 1820 and at least one application processor 1806 coupled to a secure digital (SD) card 1808 and a screen 1810. The application processor(s) 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor(s) 1824 communicates through the transceiver(s) 1822 via one or more antennas 1880 with the UE 104 and/or with an RU associated with a network entity 1802. The cellular baseband processor(s) 1824 and the application processor(s) 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor(s) 1824 and the application processor(s) 1806 are each responsible for general processing, including the execution of software stored on the computer-readable medium/memory. The software, when executed by the cellular baseband processor(s) 1824/application processor(s) 1806, causes the cellular baseband processor(s) 1824/application processor(s) 1806 to perform the various functions described supra. The cellular baseband processor(s) 1824 and the application processor(s) 1806 are configured to perform the various functions described supra based at least in part of the information stored in the memory. That is, the cellular baseband processor(s) 1824 and the application processor(s) 1806 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1824/application processor(s) 1806 when executing software. The cellular baseband processor(s) 1824/application processor(s) 1806 may be a component of the UE 350 and may include the at least one memory 360 and/or at least one of the TX processor 368, the RX processor 356, and the controller/processor 359. In one configuration, the apparatus 1804 may be at least one processor chip (modem and/or application) and include just the cellular baseband processor(s) 1824 and/or the application processor(s) 1806, and in another configuration, the apparatus 1804 may be the entire UE (e.g., see UE 350 of FIG. 3) and include the additional modules of the apparatus 1804.

As discussed supra, the component 198 may be configured to receive a first set of beacon messages from a first set of proximity devices. The component 198 may be configured to measure the first set of beacon messages. The component 198 may be configured to calculate a first position estimate of the wireless device based on the measured first set of beacon messages and a first set of locations associated with the first set of proximity devices. The component 198 may be configured to transmit the first position estimate. The component 198 may be configured to receive a second set of beacon messages from a subset of a second set of proximity devices based on the first position estimate. The component 198 may be configured to measure the second set of beacon messages. The component 198 may be configured to calculate a second position estimate of the wireless device based on the measured second set of beacon messages and a second set of locations associated with the subset of the second set of proximity devices. The component 198 may be within the cellular baseband processor(s) 1824, the application processor(s) 1806, or both the cellular baseband processor(s) 1824 and the application processor(s) 1806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1804 may include a variety of components configured for various functions. In one configuration, the apparatus 1804, and in particular the cellular baseband processor(s) 1824 and/or the application processor(s) 1806, may include means for receiving a first set of beacon messages from a first set of proximity devices. The apparatus 1804 may include means for measuring the first set of beacon messages. The apparatus 1804 may include means for calculating a first position estimate (e.g., allocation, a position) of the apparatus 1804 based on the measured first set of beacon messages and a first set of locations associated with the first set of proximity devices. The apparatus 1804 may include means for transmitting the first position estimate. The apparatus 1804 may include means for receiving a second set of beacon messages from a subset of a second set of proximity devices based on the first position estimate. The apparatus 1804 may include means for measuring the second set of beacon messages. The apparatus 1804 may include means for calculating a second position estimate of the apparatus 1804 based on the measured second set of beacon messages and a second set of locations associated with the subset of the second set of proximity devices. The apparatus 1804 may include means for receiving an indicator of a detection zone associated with the subset of the second set of proximity devices. The apparatus 1804 may include means for receiving a third set of beacon messages from the first set of proximity devices. The apparatus 1804 may include means for measuring the third set of beacon messages. The apparatus 1804 may include means for calculating a third position estimate of the apparatus 1804 based on the measured third set of beacon messages and the first set of locations associated with the first set of proximity devices. The apparatus 1804 may include means for transmitting the third position estimate in response to the third position estimate being outside the detection zone. The apparatus 1804 may include means for receiving a fourth set of beacon messages from a second subset of the second set of proximity devices based on the third position estimate. The apparatus 1804 may include means for measuring the fourth set of beacon messages. The apparatus 1804 may include means for calculating a fourth position estimate of the apparatus 1804 based on the measured fourth set of beacon messages and a third set of locations associated with the second subset of the second set of proximity devices. The apparatus 1804 may include means for measuring the first set of beacon messages by measuring a set of DL-RSSI associated with the first set of beacon messages. The apparatus 1804 may include means for transmitting a third set of beacon messages. The apparatus 1804 may include means for measuring the first set of beacon messages by estimating at least one of a set of RTT measurements, a set of bi-directional carrier phase measurements, or a set of RTP measurements based on the first set of beacon messages and the third set of beacon messages. The apparatus 1804 may include means for measuring the first set of beacon messages by measuring a set of DL-RSSI associated with the first set of beacon messages. The apparatus 1804 may include means for calculating the first position estimate by corroborating the set of DL-RSSI with at least one of the set of RTT measurements, the set of bi-directional carrier phase measurements, and/or the set of RTP measurements. The at least one of the second set of beacon messages may be interleaved between at least two of the first set of beacon messages. The first set of proximity devices may include a set of energizers that provide energy to the subset of the second set of proximity devices. The second set of proximity devices may include a set of ESL devices. The second set of beacon messages may each include an indicator of a shared location attribute. The apparatus 1804 may include means for calculating the second position estimate of the apparatus 1804 by selecting a first subset of the measured second set of beacon messages associated with a first shared location attribute and a second subset of the measured second set of beacon messages associated with a second shared location attribute different from the first shared location attribute, and by calculating the second position estimate of the apparatus 1804 based on the selected first subset of the measured second set of beacon messages and the selected second subset of the measured second set of beacon messages. The shared location attribute may include at least one of a row of shelves, a column of shelves, and/or a height of a shelf. The means may be the component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
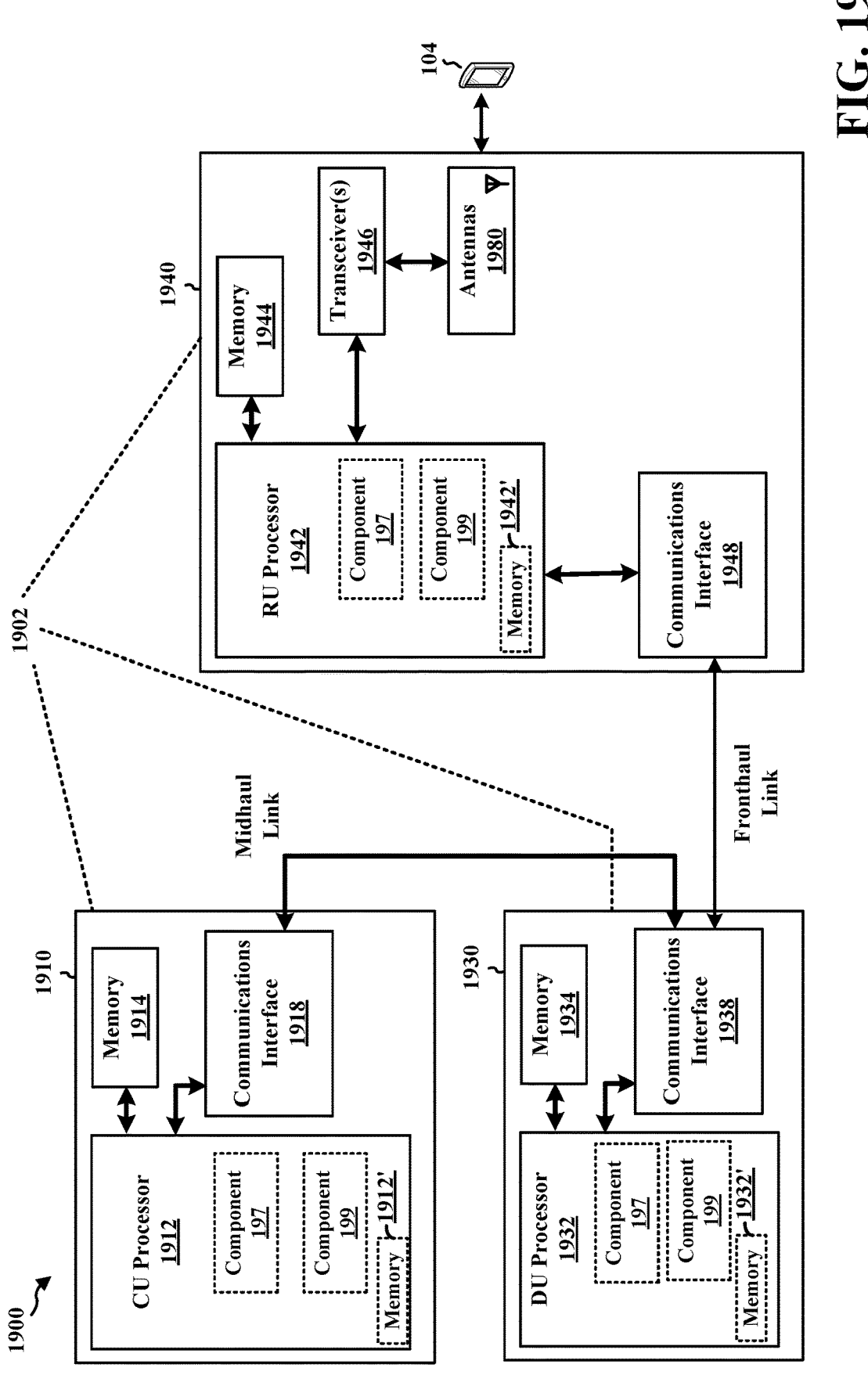
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include at least one CU processor 1912. The CU processor(s) 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include at least one DU processor 1932. The DU processor(s) 1932 may include on-chip memory 1932'. In some aspects, the DU 1930 may further include additional memory modules 1934 and a communications interface 1938. The DU 1930 communicates with the RU 1940 through a fronthaul link. The RU 1940 may include at least one RU processor 1942. The RU processor(s) 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a first position estimate of a wireless device. The component 199 may be configured to transmit a first set of beacon transmission schedules that schedule a first set of beacon messages from the subset of the first set of proximity devices based on the first position estimate of the wireless device. The component 199 may be within one or more processors of one or more of the CU 1910, DU 1930, and the RU 1940. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1902 may include a variety of components configured for various functions. In one configuration, the network entity 1902 may include means for receiving a first position estimate of a wireless device. The network entity 1902 may include means for transmitting a first set of beacon transmission schedules that schedule a first set of beacon messages from the subset of the first set of proximity devices based on the first position estimate of the wireless device. The network entity 1902 may include means for receiving a first set of beacon measurements from a subset of a first set of proximity devices. The first set of beacon measurements may be associated with the wireless device. The network entity 1902 may include means for calculating a second position estimate of the wireless device based on the first set of beacon measurements and a first set of locations associated with the subset of the first set of proximity devices. The network entity 1902 may include means for configuring the first set of beacon transmission schedules based on a second set of beacon transmission schedules that schedule a second set of beacon messages from a second set of proximity devices. The first set of proximity devices may include a set of ESL devices. The second set of proximity devices may include a set of energizers that provide energy to the subset of the first set of proximity devices. The second set of beacon messages may provide energy from the set of energizers to the subset of the first set of proximity devices. The first position estimate of the wireless device may be based on measurements of the second set of beacon messages. The network entity 1902 may include means for configuring the second set of beacon transmission schedules. The network entity 1902 may include means for transmitting the second set of beacon transmission schedules. The network entity 1902 may include means for configuring the first set of beacon transmission schedules based on the second set of beacon transmission schedules by scheduling at least one of the first set of beacon messages in between at least two of the second set of beacon messages. The first set of beacon messages may include a set of unidirectional packets. The second set of beacon messages may include a set of BCS packets. The network entity 1902 may include means for selecting the subset of the first set of proximity devices based on the first position estimate of the wireless device. The network entity 1902 may include means for calculating a detection zone based on the selected subset of the first set of proximity devices. The network entity 1902 may include means for transmitting an indicator of the detection zone. The network entity 1902 may include means for receiving a third position estimate of the wireless device. The third position estimate may be outside the detection zone. The network entity 1902 may include means for selecting a second subset of the first set of proximity devices based on the third position estimate of the wireless device. The network entity 1902 may include means for calculating a second detection zone based on the selected second subset of the first set of proximity devices. The network entity 1902 may include means for transmitting a second indicator of the second detection zone. The network entity 1902 may include means for transmitting a second set of beacon transmission schedules that schedule a second set of beacon messages from the second subset of the first set of proximity devices based on the second position estimate of the wireless device. The network entity 1902 may include means for receiving a second set of beacon measurements from a second set of proximity devices. The network entity 1902 may include means for calculating a third position estimate of the wireless device based on the second set of beacon measurements. The network entity 1902 may include means for selecting the subset of the first set of proximity devices based on the calculated third position estimate. The network entity 1902 may include means for transmitting, to the subset of the first set of proximity devices, a first set of beacon reception schedules that schedule receipt of a second set of beacons from the wireless device for a measurement of the first set of beacon measurements. The first set of proximity devices may include a set of ESL devices. The network entity 1902 may include means for transmitting, to the subset of the first set of proximity devices, a wake-up signal to receive the second set of beacons from the wireless device. The second set of proximity devices may include a set of energizers that provide energy to the wireless device. The network entity 1902 may include means for transmitting, to the second set of proximity devices, a first set of energizing schedules that schedule transmission of a first set of energizing signals. The first set of energizing signals may include a tone signature. The network entity 1902 may include means for selecting the subset of the first set of proximity devices by receiving a set of density reports from the second set of proximity devices, by calculating a density metric based on the set of density reports, and by selecting the subset of the first set of proximity devices further based on the density metric. The second set of beacon measurements may each include an indicator of a shared location attribute. The network entity 1902 may include means for calculating the third position estimate of the wireless device by selecting a second subset of the second set of beacon measurements associated with a first shared location attribute and a third subset of the second set of beacon measurements associated with a second shared location attribute different from the first shared location attribute, and by calculating the third position estimate of the wireless device based on the selected second subset of the second set of beacon measurements and the selected third subset of the second set of beacon measurements. The shared location attribute may include at least one of a row of shelves, a column of shelves, or a height of a shelf. The network node may include an edge server or an energizer AP. The means may be the component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 197 may be configured to receive a first set of beacon measurements from a subset of a first set of proximity devices. The component 197 may be configured to calculate a second position estimate of the wireless device based on the first set of beacon measurements and a first set of locations associated with the subset of the first set of proximity devices. The component 197 may be within one or more processors of one or more of the CU 1910, DU 1930, and the RU 1940. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1902 may include a variety of components configured for various functions. In one configuration, the network entity 1902 may include means for receiving a first set of beacon measurements from a subset of a first set of proximity devices. The means may be the component 197 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 20:
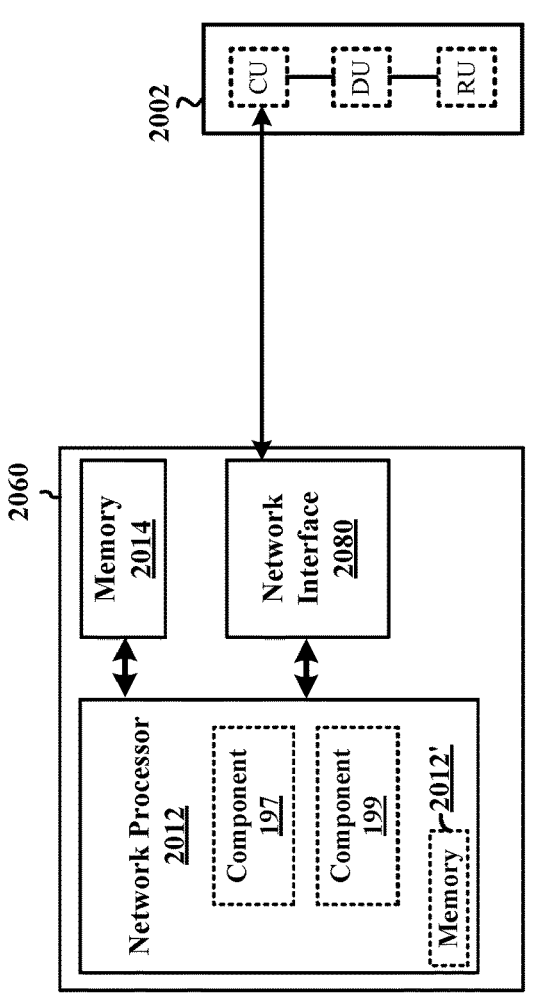
FIG. 20 is a diagram illustrating an example of a hardware implementation for an example network entity.

FIG. 20 is a diagram 2000 illustrating an example of a hardware implementation for a network entity 2060. In one example, the network entity 2060 may be within the core network 120. The network entity 2060 may include at least one network processor 2012. The network processor(s) 2012 may include on-chip memory 2012'. In some aspects, the network entity 2060 may further include additional memory modules 2014. The network entity 2060 communicates via the network interface 2080 directly (e.g., backhaul link) or indirectly (e.g., through a RIC) with the CU 2002. The on-chip memory 2012' and the additional memory modules 2014 may each be considered a computer-readable medium/memory. Each computer-readable medium/memory may be non-transitory. The network processor(s) 2012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a first position estimate of a wireless device. The component 199 may be configured to transmit a first set of beacon transmission schedules that schedule a first set of beacon messages from the subset of the first set of proximity devices based on the first position estimate of the wireless device. The component 199 may be within the network processor(s) 2012. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2060 may include a variety of components configured for various functions. In one configuration, the network entity 2060 may include means for receiving a first position estimate of a wireless device. The network entity 2060 may include means for transmitting a first set of beacon transmission schedules that schedule a first set of beacon messages from the subset of the first set of proximity devices based on the first position estimate of the wireless device. The network entity 2060 may include means for receiving a first set of beacon measurements from a subset of a first set of proximity devices. The first set of beacon measurements may be associated with the wireless device. The network entity 2060 may include means for calculating a second position estimate of the wireless device based on the first set of beacon measurements and a first set of locations associated with the subset of the first set of proximity devices. The network entity 2060 may include means for configuring the first set of beacon transmission schedules based on a second set of beacon transmission schedules that schedule a second set of beacon messages from a second set of proximity devices. The first set of proximity devices may include a set of ESL. The second set of proximity devices may include a set of energizers that provide energy to the subset of the first set of proximity devices. The second set of beacon messages may provide energy from the set of energizers to the subset of the first set of proximity devices. The first position estimate of the wireless device may be based on measurements of the second set of beacon messages. The network entity 2060 may include means for configuring the second set of beacon transmission schedules. The network entity 2060 may include means for transmitting the second set of beacon transmission schedules. The network entity 2060 may include means for configuring the first set of beacon transmission schedules based on the second set of beacon transmission schedules by scheduling at least one of the first set of beacon messages in between at least two of the second set of beacon messages. The first set of beacon messages may include a set of unidirectional packets. The second set of beacon messages may include a set of BCS packets. The network entity 2060 may include means for selecting the subset of the first set of proximity devices based on the first position estimate of the wireless device. The network entity 2060 may include means for calculating a detection zone based on the selected subset of the first set of proximity devices. The network entity 2060 may include means for transmitting an indicator of the detection zone. The network entity 2060 may include means for receiving a third position estimate of the wireless device. The third position estimate may be outside the detection zone. The network entity 2060 may include means for selecting a second subset of the first set of proximity devices based on the third position estimate of the wireless device. The network entity 2060 may include means for calculating a second detection zone based on the selected second subset of the first set of proximity devices. The network entity 2060 may include means for transmitting a second indicator of the second detection zone. The network entity 2060 may include means for transmitting a second set of beacon transmission schedules that schedule a second set of beacon messages from the second subset of the first set of proximity devices based on the second position estimate of the wireless device. The network entity 2060 may include means for receiving a second set of beacon measurements from a second set of proximity devices. The network entity 2060 may include means for calculating a third position estimate of the wireless device based on the second set of beacon measurements. The network entity 2060 may include means for selecting the subset of the first set of proximity devices based on the calculated third position estimate. The network entity 2060 may include means for transmitting, to the subset of the first set of proximity devices, a first set of beacon reception schedules that schedule receipt of a second set of beacons from the wireless device for a measurement of the first set of beacon measurements. The first set of proximity devices may include a set of ESL devices. The network entity 2060 may include means for transmitting, to the subset of the first set of proximity devices, a wake-up signal to receive the second set of beacons from the wireless device. The second set of proximity devices may include a set of energizers that provide energy to the wireless device. The network entity 2060 may include means for transmitting, to the second set of proximity devices, a first set of energizing schedules that schedule transmission of a first set of energizing signals. The first set of energizing signals may include a tone signature. The network entity 2060 may include means for selecting the subset of the first set of proximity devices by receiving a set of density reports from the second set of proximity devices, by calculating a density metric based on the set of density reports, and by selecting the subset of the first set of proximity devices further based on the density metric. The second set of beacon measurements may each include an indicator of a shared location attribute. The network entity 2060 may include means for calculating the third position estimate of the wireless device by selecting a second subset of the second set of beacon measurements associated with a first shared location attribute and a third subset of the second set of beacon measurements associated with a second shared location attribute different from the first shared location attribute, and by calculating the third position estimate of the wireless device based on the selected second subset of the second set of beacon measurements and the selected third subset of the second set of beacon measurements. The shared location attribute may include at least one of a row of shelves, a column of shelves, or a height of a shelf. The network node may include an edge server or an energizer AP. The means may be the component 199 of the network entity 2060 configured to perform the functions recited by the means.

As discussed supra, the component 197 may be configured to receive a first set of beacon measurements from a subset of a first set of proximity devices. The component 197 may be configured to calculate a second position estimate of the wireless device based on the first set of beacon measurements and a first set of locations associated with the subset of the first set of proximity devices. The component 197 may be within the network processor(s) 2012. The component 197 may be one or more hardware components specifically configured to carry out the stated processes/ algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2060 may include a variety of components configured for various functions. In one configuration, the network entity 2060 may include means for receiving a first set of beacon measurements from a subset of a first set of proximity devices. The means may be the component 197 of the network entity 2060 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, comprising: receiving a first set of beacon messages from a first set of proximity devices; measuring the first set of beacon messages; calculating a first position estimate of the wireless device based on the measured first set of beacon messages and a first set of locations associated with the first set of proximity devices; transmitting the first position estimate; receiving a second set of beacon messages from a subset of a second set of proximity devices based on the first position estimate; measuring the second set of beacon messages; and calculating a second position estimate of the wireless device based on the measured second set of beacon messages and a second set of locations associated with the subset of the second set of proximity devices.

Aspect 2 is the method of aspect 1, further comprising: receiving an indicator of a detection zone associated with the subset of the second set of proximity devices; receiving a third set of beacon messages from the first set of proximity devices; measuring the third set of beacon messages; calculating a third position estimate of the wireless device based on the measured third set of beacon messages and the first set of locations associated with the first set of proximity devices; transmitting the third position estimate in response to the third position estimate being outside the detection zone; receiving a fourth set of beacon messages from a second subset of the second set of proximity devices based on the third position estimate; measuring the fourth set of beacon messages; and calculating a fourth position estimate of the wireless device based on the measured fourth set of beacon messages and a third set of locations associated with the second subset of the second set of proximity devices.

Aspect 3 is the method of either of aspects 1 or 2, wherein measuring the first set of beacon messages comprises measuring a set of downlink (DL) reference signal strength indicators (DL-RSSI) associated with the first set of beacon messages.

Aspect 4 is the method of any of aspects 1 to 3, further comprising: transmitting a third set of beacon messages, wherein measuring the first set of beacon messages comprises estimating at least one of a set of round trip time (RTT) measurements, a set of bi-directional carrier phase measurements, or a set of round trip phase (RTP) measurements based on the first set of beacon messages and the third set of beacon messages.

Aspect 5 is the method of aspect 4, wherein measuring the first set of beacon messages further comprises measuring a set of downlink (DL) reference signal strength indicators (DL-RSSI) associated with the first set of beacon messages, wherein calculating the first position estimate comprises corroborating the set of DL-RSSI with at least one of the set of RTT measurements, the set of bi-directional carrier phase measurements, or the set of RTP measurements.

Aspect 6 is the method of aspect 5, wherein the at least one of the second set of beacon messages is interleaved between at least two of the first set of beacon messages.

Aspect 7 is the method of any of aspects 1 to 6, wherein the first set of proximity devices comprises a set of energizers that provide energy to the subset of the second set of proximity devices.

Aspect 8 is the method of aspect 7, wherein the second set of proximity devices comprises a set of electronic shelf label (ESL) devices.

Aspect 9 is the method of any of aspects 1 to 7, wherein the second set of beacon messages each comprise an indicator of a shared location attribute, wherein calculating the second position estimate of the wireless device comprises: selecting a first subset of the measured second set of beacon messages associated with a first shared location attribute and a second subset of the measured second set of beacon messages associated with a second shared location attribute different from the first shared location attribute; and calculating the second position estimate of the wireless device based on the selected first subset of the measured second set of beacon messages and the selected second subset of the measured second set of beacon messages.

Aspect 10 is the method of aspect 9, wherein the shared location attribute comprises at least one of a row of shelves, a column of shelves, or a height of a shelf.

Aspect 11 is a method of wireless communication at a network node, comprising: receiving a first position estimate of a wireless device or receiving a first set of beacon measurements from a subset of a first set of proximity devices, wherein the first set of beacon measurements are associated with the wireless device; and transmitting a first set of beacon transmission schedules that schedule a first set of beacon messages from the subset of the first set of proximity devices based on the first position estimate of the wireless device or calculating a second position estimate of the wireless device based on the first set of beacon measurements and a first set of locations associated with the subset of the first set of proximity devices.

Aspect 12 is the method of aspect 11, further comprising: configuring the first set of beacon transmission schedules based on a second set of beacon transmission schedules that schedule a second set of beacon messages from a second set of proximity devices.

Aspect 13 is the method of aspect 12, wherein the first set of proximity devices comprises a set of electronic shelf label (ESL) devices, wherein the second set of proximity devices comprises a set of energizers that provide energy to the subset of the first set of proximity devices.

Aspect 14 is the method of aspect 13, wherein the second set of beacon messages is configured to provide energy from the set of energizers to the subset of the first set of proximity devices.

Aspect 15 is the method of aspect 14, wherein the first position estimate of the wireless device is based on measurements of the second set of beacon messages.

Aspect 16 is the method of any of aspects 12 to 15, further comprising: configuring the second set of beacon transmission schedules; and transmitting the second set of beacon transmission schedules.

Aspect 17 is the method of any of aspects 12 to 16, wherein configuring the first set of beacon transmission schedules based on the second set of beacon transmission schedules comprises scheduling at least one of the first set of beacon messages in between at least two of the second set of beacon messages.

Aspect 18 is the method of any of aspects 12 to 17, wherein the first set of beacon messages comprises a set of unidirectional packets, wherein the second set of beacon messages comprise a set of Bluetooth channel sounding (BCS) packets.

Aspect 19 is the method of any of aspects 11 to 18, further comprising: selecting the subset of the first set of proximity devices based on the first position estimate of the wireless device; calculating a detection zone based on the selected subset of the first set of proximity devices; and transmitting an indicator of the detection zone.

Aspect 20 is the method of aspect 19, further comprising: receiving a third position estimate of the wireless device, wherein the third position estimate is outside the detection zone; selecting a second subset of the first set of proximity devices based on the third position estimate of the wireless device; calculating a second detection zone based on the selected second subset of the first set of proximity devices; transmitting a second indicator of the second detection zone; and transmitting a second set of beacon transmission schedules that schedule a second set of beacon messages from the second subset of the first set of proximity devices based on the second position estimate of the wireless device.

Aspect 21 is the method of any of aspects 11 to 20, further comprising: receiving a second set of beacon measurements from a second set of proximity devices; calculating a third position estimate of the wireless device based on the second set of beacon measurements; selecting the subset of the first set of proximity devices based on the calculated third position estimate; and transmitting, to the subset of the first set of proximity devices, a first set of beacon reception schedules that schedule receipt of a second set of beacons from the wireless device for a measurement of the first set of beacon measurements.

Aspect 22 is the method of aspect 21, wherein the first set of proximity devices comprises a set of electronic shelf label (ESL) devices, further comprising: transmitting, to the subset of the first set of proximity devices, a wake-up signal to receive the second set of beacons from the wireless device.

Aspect 23 is the method of either of aspects 21 or 22, wherein the second set of proximity devices comprises a set of energizers that provide energy to the wireless device.

Aspect 24 is the method of aspect 23, further comprising: transmitting, to the second set of proximity devices, a first set of energizing schedules that schedule transmission of a first set of energizing signals, wherein the first set of energizing signals comprise a tone signature.

Aspect 25 is the method of any of aspects 21 to 24, wherein selecting the subset of the first set of proximity devices comprises: receiving a set of density reports from the second set of proximity devices; calculating a density metric based on the set of density reports; and selecting the subset of the first set of proximity devices further based on the density metric.

Aspect 26 is the method of any of aspects 21 to 25, wherein the second set of beacon measurements each comprise an indicator of a shared location attribute, wherein calculating the third position estimate of the wireless device comprises: selecting a second subset of the second set of beacon measurements associated with a first shared location attribute and a third subset of the second set of beacon measurements associated with a second shared location attribute different from the first shared location attribute; and calculating the third position estimate of the wireless device based on the selected second subset of the second set of beacon measurements and the selected third subset of the second set of beacon measurements.

Aspect 27 is the method of aspect 26, wherein the shared location attribute comprises at least one of a row of shelves, a column of shelves, or a height of a shelf.

Aspect 28 is the method of any of aspects 11 to 27, wherein the network node comprises an edge server or an energizer access point (AP).

Aspect 29 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 28.

Aspect 30 is an apparatus for wireless communication, comprising means for performing each step in the method of any of aspects 1 to 28.

Aspect 31 is the apparatus of any of aspects 1 to 28, further comprising a transceiver configured to receive or to transmit in association with the method of any of aspects 1 to 28.

Aspect 32 is a computer-readable medium (e.g., a computer-readable medium) storing computer executable code, the code when executed by at least one processor causes the at least one processor to perform the method of any of aspects 1 to 28.

What is claimed is:

1. An apparatus for wireless communication at a wireless device, comprising:
   at least one memory; and
   at least one processor coupled to the at least one memory and, based at least in part on information stored in the at least one memory, the at least one processor, individually or in any combination, is configured to:
   receive a first set of beacon messages from a first set of proximity devices;
   measure the first set of beacon messages;
   calculate a first position estimate of the wireless device based on the measured first set of beacon messages and a first set of locations associated with the first set of proximity devices;
   transmit the first position estimate;
   receive a second set of beacon messages from a subset of a second set of proximity devices based on the first position estimate;
   measure the second set of beacon messages; and
   calculate a second position estimate of the wireless device based on the measured second set of beacon messages and a second set of locations associated with the subset of the second set of proximity devices;

wherein the first set of proximity devices comprises a set of energizers that provide energy to the subset of the second set of proximity devices.

2. The apparatus of claim 1, wherein the at least one processor, individually or in any combination, is further configured to:

receive an indicator of a detection zone associated with the subset of the second set of proximity devices;

receive a third set of beacon messages from the first set of proximity devices;

measure the third set of beacon messages;

calculate a third position estimate of the wireless device based on the measured third set of beacon messages and the first set of locations associated with the first set of proximity devices;

transmit the third position estimate in response to the third position estimate being outside the detection zone;

receive a fourth set of beacon messages from a second subset of the second set of proximity devices based on the third position estimate;

measure the fourth set of beacon messages; and calculate a fourth position estimate of the wireless device based on the measured fourth set of beacon messages and a third set of locations associated with the second subset of the second set of proximity devices.

3. The apparatus of claim 1, wherein, to measure the first set of beacon messages, the at least one processor, individually or in any combination, is configured to:

measure a set of downlink (DL) reference signal strength indicators (DL-RSSI) associated with the first set of beacon messages.

4. The apparatus of claim 1, wherein the at least one processor, individually or in any combination, is further configured to:

transmit a third set of beacon messages, wherein, to measure the first set of beacon messages, the at least one processor, individually or in any combination, is configured to estimate at least one of a set of round trip time (RTT) measurements, a set of bi-directional carrier phase measurements, or a set of round trip phase (RTP) measurements based on the first set of beacon messages and the third set of beacon messages.

5. The apparatus of claim 4, wherein, to measure the first set of beacon messages, the at least one processor, individually or in any combination, is further configured to measure a set of downlink (DL) reference signal strength indicators (DL-RSSI) associated with the first set of beacon messages, wherein, to calculate the first position estimate, the at least one processor, individually or in any combination, is configured to corroborate the set of DL-RSSI with at least one of the set of RTT measurements, the set of bi-directional carrier phase measurements, or the set of RTP measurements.

6. The apparatus of claim 5, wherein the at least one of the second set of beacon messages is interleaved between at least two of the first set of beacon messages.

7. The apparatus of claim 1, wherein the second set of proximity devices comprises a set of electronic shelf label (ESL) devices.

8. The apparatus of claim 1, wherein the second set of beacon messages each comprise an indicator of a shared location attribute, wherein, to calculate the second position estimate of the wireless device, the at least one processor, individually or in any combination, is configured to:

select a first subset of the measured second set of beacon messages associated with a first shared location attribute and a second subset of the measured second set of beacon messages associated with a second shared location attribute different from the first shared location attribute; and calculate the second position estimate of the wireless device based on the selected first subset of the measured second set of beacon messages and the selected second subset of the measured second set of beacon messages.

9. The apparatus of claim 8, wherein the shared location attribute comprises at least one of a row of shelves, a column of shelves, or a height of a shelf.

10. An apparatus for wireless communication at a network node, comprising:

at least one memory; and at least one processor coupled to the at least one memory and, based at least in part on information stored in the at least one memory, the at least one processor, individually or in any combination, is configured to:

receive a first position estimate of a wireless device or receive a first set of beacon measurements from a subset of a first set of proximity devices, wherein the first set of beacon measurements are associated with the wireless device;

transmit a first set of beacon transmission schedules that schedule a first set of beacon messages from the subset of the first set of proximity devices based on the first position estimate of the wireless device or calculate a second position estimate of the wireless device based on the first set of beacon measurements and a first set of locations associated with the subset of the first set of proximity devices; and configure the first set of beacon transmission schedules based on a second set of beacon transmission schedules that schedule a second set of beacon messages from a second set of proximity devices.

11. The apparatus of claim 10, wherein the first set of proximity devices comprises a set of electronic shelf label (ESL) devices, wherein the second set of proximity devices comprises a set of energizers that provide energy to the subset of the first set of proximity devices.

12. The apparatus of claim 11, wherein the second set of beacon messages is configured to provide energy from the set of energizers to the subset of the first set of proximity devices.

13. The apparatus of claim 12, wherein the first position estimate of the wireless device is based on measurements of the second set of beacon messages.

14. The apparatus of claim 10, wherein the at least one processor, individually or in any combination, is further configured to:

configure the second set of beacon transmission schedules; and transmit the second set of beacon transmission schedules.

15. The apparatus of claim 10, wherein, to configure the first set of beacon transmission schedules based on the second set of beacon transmission schedules, the at least one processor, individually or in any combination, is configured to:

schedule at least one of the first set of beacon messages in between at least two of the second set of beacon messages.

16. The apparatus of claim 10, wherein the first set of beacon messages comprises a set of unidirectional packets, wherein the second set of beacon messages comprise a set of Bluetooth channel sounding (BCS) packets.

17. The apparatus of claim 10, wherein the at least one processor, individually or in any combination, is further configured to:

select the subset of the first set of proximity devices based on the first position estimate of the wireless device;

calculate a detection zone based on the selected subset of the first set of proximity devices; and transmit an indicator of the detection zone.

18. The apparatus of claim 17, wherein the at least one processor, individually or in any combination, is further configured to:

receive a third position estimate of the wireless device, wherein the third position estimate is outside the detection zone;

select a second subset of the first set of proximity devices based on the third position estimate of the wireless device;

calculate a second detection zone based on the selected second subset of the first set of proximity devices;

transmit a second indicator of the second detection zone; and transmit a second set of beacon transmission schedules that schedule a second set of beacon messages from the second subset of the first set of proximity devices based on the second position estimate of the wireless device.

19. The apparatus of claim 10, wherein the at least one processor, individually or in any combination, is further configured to:

receive a second set of beacon measurements from a second set of proximity devices;

calculate a third position estimate of the wireless device based on the second set of beacon measurements;

select the subset of the first set of proximity devices based on the calculated third position estimate; and transmit, to the subset of the first set of proximity devices, a first set of beacon reception schedules that schedule receipt of a second set of beacons from the wireless device for a measurement of the first set of beacon measurements.

20. The apparatus of claim 19, wherein the first set of proximity devices comprises a set of electronic shelf label (ESL) devices, wherein the at least one processor, individually or in any combination, is further configured to:

transmit, to the subset of the first set of proximity devices, a wake-up signal to receive the second set of beacons from the wireless device.

21. The apparatus of claim 19, wherein the second set of proximity devices comprises a set of energizers that provide energy to the wireless device.

22. The apparatus of claim 21, wherein the at least one processor, individually or in any combination, is further configured to:

transmit, to the second set of proximity devices, a first set of energizing schedules that schedule transmission of a first set of energizing signals, wherein the first set of energizing signals comprise a tone signature.

23. The apparatus of claim 19, wherein, to select the subset of the first set of proximity devices, the at least one processor, individually or in any combination, is configured to:

receive a set of density reports from the second set of proximity devices;

calculate a density metric based on the set of density reports; and select the subset of the first set of proximity devices further based on the density metric.

24. The apparatus of claim 19, wherein the second set of beacon measurements each comprise an indicator of a shared location attribute, wherein, to calculate the third position estimate of the wireless device, the at least one processor, individually or in any combination, is configured to:

select a second subset of the second set of beacon measurements associated with a first shared location attribute and a third subset of the second set of beacon measurements associated with a second shared location attribute different from the first shared location attribute; and calculate the third position estimate of the wireless device based on the selected second subset of the second set of beacon measurements and the selected third subset of the second set of beacon measurements.

25. The apparatus of claim 24, wherein the shared location attribute comprises at least one of a row of shelves, a column of shelves, or a height of a shelf.

26. The apparatus of claim 10, wherein the network node comprises an edge server or an energizer access point (AP).

27. A method of wireless communication at a wireless device, comprising:

receiving a first set of beacon messages from a first set of proximity devices;

measuring the first set of beacon messages;

calculating a first position estimate of the wireless device based on the measured first set of beacon messages and a first set of locations associated with the first set of proximity devices;

transmitting the first position estimate;

receiving a second set of beacon messages from a subset of a second set of proximity devices based on the first position estimate;

measuring the second set of beacon messages; and calculating a second position estimate of the wireless device based on the measured second set of beacon messages and a second set of locations associated with the subset of the second set of proximity devices;

wherein the first set of proximity devices comprises a set of energizers that provide energy to the subset of the second set of proximity devices.

28. A method of wireless communication at a network node, comprising:

receiving a first position estimate of a wireless device or receiving a first set of beacon measurements from a subset of a first set of proximity devices, wherein the first set of beacon measurements are associated with the wireless device;

transmitting a first set of beacon transmission schedules that schedule a first set of beacon messages from the subset of the first set of proximity devices based on the first position estimate of the wireless device or calculating a second position estimate of the wireless device based on the first set of beacon measurements and a first set of locations associated with the subset of the first set of proximity devices; and configuring the first set of beacon transmission schedules based on a second set of beacon transmission schedules that schedule a second set of beacon messages from a second set of proximity devices.

* * * * *